(12) United States Patent
Abenaim et al.

(10) Patent No.: US 10,488,532 B2
(45) Date of Patent: Nov. 26, 2019

(54) DETECTOR UNIT FOR DETECTOR ARRAY OF RADIATION IMAGING MODALITY

(71) Applicant: Analogic Corporation, Peabody, MA (US)

(72) Inventors: Daniel Abenaim, Lynnfield, MA (US); Randy Luhta, Chardon, OH (US); Martin Choquette, Exeter, NH (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 15/520,439

(22) PCT Filed: Oct. 20, 2014

(86) PCT No.: PCT/US2014/061349
§ 371 (c)(1),
(2) Date: Apr. 20, 2017

(87) PCT Pub. No.: WO2016/064374
PCT Pub. Date: Apr. 28, 2016

(65) Prior Publication Data
US 2017/0307766 A1    Oct. 26, 2017

(51) Int. Cl.
*G01T 1/20*    (2006.01)
*G01T 1/24*    (2006.01)

(52) U.S. Cl.
CPC ............ *G01T 1/2018* (2013.01); *G01T 1/241* (2013.01); *G01T 1/244* (2013.01)

(58) Field of Classification Search
CPC .. G01T 1/20; G01T 1/24; G01T 1/244; G01T 1/2018
See application file for complete search history.

(56) References Cited

U.S. PATENT DOCUMENTS

| | | | | | |
|---|---|---|---|---|---|
| 4,052,620 | A | * | 10/1977 | Brunnett | A61B 6/032 378/901 |
| 4,912,545 | A | * | 3/1990 | Go | H01L 24/10 228/179.1 |

(Continued)

FOREIGN PATENT DOCUMENTS

| | | |
|---|---|---|
| CN | 102938409 A | 2/2013 |
| CN | 103904152 A | 7/2014 |

(Continued)

OTHER PUBLICATIONS

International Search Report cited in related application No. PCT/US14/61349 dated Jul. 9, 2015, pp. 13.

(Continued)

*Primary Examiner* — Marcus H Taningco
*Assistant Examiner* — Djura Malevic
(74) *Attorney, Agent, or Firm* — TraskBritt

(57) ABSTRACT

Among other things, a detector unit for a detector array of a radiation imaging modality is provided. In some embodiments, the detector unit comprises a radiation detection sub-assembly and an electronics sub-assembly. The electronics sub-assembly comprises electronic circuitry, embedded within a molding compound, configured to digitize analog signals yielded from the radiation detection sub-assembly and/or to otherwise process such analog signals. The electronics sub-assembly also comprises a substrate, such as a printed circuit board, configured to route signals between the electronic circuitry and a photodetector array of the radiation detection sub-assembly and/or to route signals between the electronic circuitry and digital processing components, such as an image generator, for example.

13 Claims, 13 Drawing Sheets

(56) References Cited

U.S. PATENT DOCUMENTS

| | | | | | |
|---|---|---|---|---|---|
| 5,635,718 | A | * | 6/1997 | DePuydt | H01L 27/14634 250/208.1 |
| 5,783,865 | A | * | 7/1998 | Higashiguchi | H01L 23/13 257/774 |
| 6,133,574 | A | * | 10/2000 | Blendinger | G01N 23/083 250/370.11 |
| 6,292,528 | B1 | * | 9/2001 | Wieczorek | A61B 6/032 250/363.02 |
| 6,396,898 | B1 | * | 5/2002 | Saito | G01N 23/046 378/19 |
| 6,510,195 | B1 | * | 1/2003 | Chappo | G01T 1/2018 250/208.1 |
| 6,635,866 | B2 | * | 10/2003 | Chan | G02B 6/4232 250/239 |
| 6,671,345 | B2 | * | 12/2003 | Vrettos | A61B 6/032 378/19 |
| 6,933,505 | B2 | * | 8/2005 | Vuorela | H01L 27/14634 250/370.11 |
| 7,223,981 | B1 | * | 5/2007 | Capote | H01L 27/14634 250/370.13 |
| 7,504,637 | B2 | * | 3/2009 | Thorne | G01T 1/2018 250/370.09 |
| 7,564,940 | B2 | * | 7/2009 | Mattson | A61B 6/032 250/370.09 |
| 7,582,879 | B2 | * | 9/2009 | Abenaim | G01T 1/2018 250/370.11 |
| 7,645,998 | B2 | * | 1/2010 | Danzer | G01T 1/2985 250/370.08 |
| 7,769,128 | B2 | * | 8/2010 | Ratzmann | A61B 6/035 250/370.09 |
| 7,838,994 | B2 | * | 11/2010 | Shibayama | G01T 1/2018 257/774 |
| 8,548,119 | B2 | | 10/2013 | Ikhlef et al. | |
| 8,563,941 | B1 | * | 10/2013 | Chappo | A61B 6/00 250/370.11 |
| 8,829,454 | B2 | * | 9/2014 | Bolognia | H01L 31/024 250/370.09 |
| 8,946,644 | B2 | * | 2/2015 | Nariyuki | G01T 1/2018 250/369 |
| 9,116,022 | B2 | * | 8/2015 | Bolognia | H01L 31/0203 |
| 9,322,938 | B2 | * | 4/2016 | Kammerer | G01T 1/2985 |
| 9,466,594 | B2 | * | 10/2016 | Bolognia | H01L 31/024 |
| 2002/0011572 | A1 | * | 1/2002 | Kajiwara | H01L 27/14623 250/370.11 |
| 2002/0038851 | A1 | * | 4/2002 | Kajiwara | A61B 6/4216 250/368 |
| 2002/0064252 | A1 | * | 5/2002 | Igarashi | A61B 6/06 378/19 |
| 2002/0070343 | A1 | * | 6/2002 | Hoffman | G01T 1/2018 250/367 |
| 2002/0163993 | A1 | * | 11/2002 | Hoffman | G01T 1/2985 378/19 |
| 2003/0016779 | A1 | * | 1/2003 | Pohan | A61B 6/035 378/19 |
| 2004/0004189 | A1 | * | 1/2004 | Brahme | G01T 1/24 250/370.08 |
| 2004/0065465 | A1 | * | 4/2004 | Chappo | A61B 6/032 174/66 |
| 2005/0012047 | A1 | * | 1/2005 | Pohan | G01T 1/2018 250/370.09 |
| 2005/0029463 | A1 | * | 2/2005 | Kaemmerer | H05K 1/0271 250/370.01 |
| 2006/0071173 | A1 | * | 4/2006 | Zeman | G01T 1/249 250/370.11 |
| 2008/0011959 | A1 | * | 1/2008 | Thorne | G01T 1/2018 250/370.09 |
| 2008/0165921 | A1 | * | 7/2008 | Tkaczyk | A61B 6/032 378/19 |
| 2008/0253507 | A1 | * | 10/2008 | Levene | G01T 1/2018 378/19 |
| 2011/0272588 | A1 | * | 11/2011 | Jadrich | G01T 1/20 250/370.11 |
| 2014/0270057 | A1 | | 9/2014 | Bartolome et al. | |

FOREIGN PATENT DOCUMENTS

| | | |
|---|---|---|
| EP | 1492168 A1 | 12/2004 |
| WO | 2007/117799 A2 | 10/2007 |
| WO | 2007117799 A2 | 10/2007 |
| WO | 2010/109353 A2 | 9/2010 |
| WO | 2010109353 A2 | 9/2010 |

OTHER PUBLICATIONS

Luhta, et al., "A new 2D-tiled detector for multislice CT", Progress in Biomedical Optics and Imaging, Spie—International Society for Optical Engineering, Bellingham, WA, US, vol. 6142, Feb. 12, 2006, pp. 12.

EP Communication cited in EP Application No. 14792959.0 dated Feb. 26, 2018, 8 pgs.

"A New 2D-Tiled Detector for Multislice CT", Feb. 12, 2006, Randy Luhta, Marc Chappo, Brian Harwood and Chris Vrettos, Progress in Biomedical, Optics and Imaging, SPIE International Society for Optical Engineering, Bellingham, WA, US, vol. 6142, Abstract only, 4 pgs.

The State Intellectual Property Office of People's Republic of China (SIPO), The First Office Action dated Aug. 3, 2018 in co-pending CN Application No. 201480083534.3 having a filing date of May 19, 2017 (6 pgs).

International Written Opinion for International Patent Application No. PCT/US2014/061349, dated Jul. 9, 2015, 7 pages.

International Search Report for International Patent Application No. PCT/US2014/061349, dated Jul. 9, 2015, 4 pages.

Chinese Search Report for Chinese Application No. 201480083534, dated Jul. 26, 2018, 1 page.

Communication from the Examining Division dated Jun 14, 2019 for EP Application No. 14792959, 9 pages.

* cited by examiner

DETECTOR UNIT FOR DETECTOR ARRAY OF RADIATION IMAGING MODALITY

BACKGROUND

The present application relates to measuring radiation attenuation by an object exposed to radiation. It finds particular application in the field of computed tomography (CT) imaging utilized in medical, security, and/or industrial applications, for example. However, it also relates to other radiation imaging modalities where converting radiation energy into digital signals may be useful, such as for imaging and/or object detection.

Radiation imaging modalities such as CT systems, single-photon emission computed tomography (SPECT) systems, digital projection systems, and/or line-scan systems, for example, are useful to provide information, or images, of interior aspects of an object under examination. Generally, the object is exposed to radiation comprising photons (e.g., such as x-rays, gamma rays, etc.), and an image(s) is formed based upon the radiation absorbed and/or attenuated by the interior aspects of the object, or rather a number of radiation photons that are able to pass through the object. Generally, highly dense aspects of the object absorb and/or attenuate more radiation than less dense aspects, and thus an aspect having a higher density, such as a bone or metal, for example, will be apparent when surrounded by less dense aspects, such as muscle or clothing.

The detector array typically comprises a plurality of detector cells, respectively configured to convert detected radiation into electrical signals. Based upon the number of radiation photons detected by respective detector cells and/or the electrical charge generated by respective detector cells between samplings, images can be reconstructed that are indicative of the density, z-effective, shape, and/or other properties of the object and/or aspects thereof.

The number of detector cells comprised within a detector array may be application specific. For example, in security applications where it is desirable to continuously translate an object (e.g., on a conveyor belt) while acquiring volumetric data about the object, the number of detector cells may exceed 100,000. In other applications, such as in mammography applications where the object is stationary and two-dimensional data is acquired, the number of detector cells may exceed 10,000,000.

To, among other things, facilitate a modular design of detector arrays, self-contained detector units (e.g., also referred to as tiles) have recently been developed. Respective detector units comprise a plurality of detector cells (e.g., 128 detector cells, 256 detector cells, etc.) and can be arranged with other detector units to form a detector array having a desired number of detector cells, a desired size, and/or a desired shape. For example, U.S. Pat. No. 7,582,879, assigned to Analogic Corporation, describes a self-contained detector unit that comprises, among other things, a scintillator, a photodetector array, and an integrated circuit (e.g., comprising, among other things, an A/D converter).

SUMMARY

Aspects of the present application address the above matters, and others. According to one aspect, a detector unit for a detector array of a radiation imaging modality is provided. The detector unit comprises an electronics sub-assembly comprising an analog-to-digital (A/D) converter enclosed within a molding compound. The electronics sub-assembly also comprises a substrate disposed at a first surface of the electronics sub-assembly and configured to electrically couple the electronics sub-assembly to a photodetector array of the detector unit. The electronics sub-assembly also comprises a first coupling element configured to electrically couple the A/D converter to the substrate.

According to another aspect, a radiation imaging modality is provided. The radiation imaging modality comprises an ionizing radiation source and a detector array configured to detect radiation generated by the ionizing radiation source. The detector array comprises a detector unit comprising a radiation detection sub-assembly and an electronics sub-assembly. The radiation detection sub-assembly comprises a scintillator configured to generate luminescent photons based upon radiation impinging thereon and a photodetector array comprising one or more photodetectors configured to detect at least some of the luminescent photons and to generate an analog signal based upon the at least some of the luminescent photons. The electronics sub-assembly comprises an analog-to-digital (A/D) converter enclosed within a molding compound and configured to convert the analog signal to a digital signal. The electronics sub-assembly also comprises a substrate disposed at a first surface of the electronics sub-assembly and configured to electrically couple the electronics sub-assembly to the photodetector array. The electronics sub-assembly also comprises a first coupling element configured to electrically couple the A/D converter to the substrate.

According to yet another aspect, a radiation imaging modality is provided. The radiation imaging modality comprises an ionizing radiation source and a detector array configured to detect radiation generated by the ionizing radiation source. The detector array comprises a detector unit comprising a radiation detection sub-assembly and an electronics sub-assembly. The radiation detection sub-assembly comprises a scintillator configured to generate luminescent photons based upon radiation impinging thereon and a photodetector array comprising one or more photodetectors configured to detect at least some of the luminescent photons and to generate an analog signal based upon the at least some of the luminescent photons. The electronics sub-assembly comprises an analog-to-digital (A/D) converter enclosed within a molding compound and configured to convert the analog signal to a digital signal. The electronics sub-assembly also comprises a substrate disposed at a first surface of the electronics sub-assembly and configured to electrically couple the electronics sub-assembly to the photodetector array. The electronics sub-assembly also comprises a shielding element disposed between the A/D converter and the substrate and configured to shield the A/D converter from the radiation and a first coupling element configured to electrically couple the A/D converter to the substrate.

Those of ordinary skill in the art will appreciate still other aspects of the present application upon reading and understanding the appended description.

FIGURES

The application is illustrated by way of example and not limitation in the figures of the accompanying drawings, in which like references generally indicate similar elements and in which.

DESCRIPTION

Figure 1:
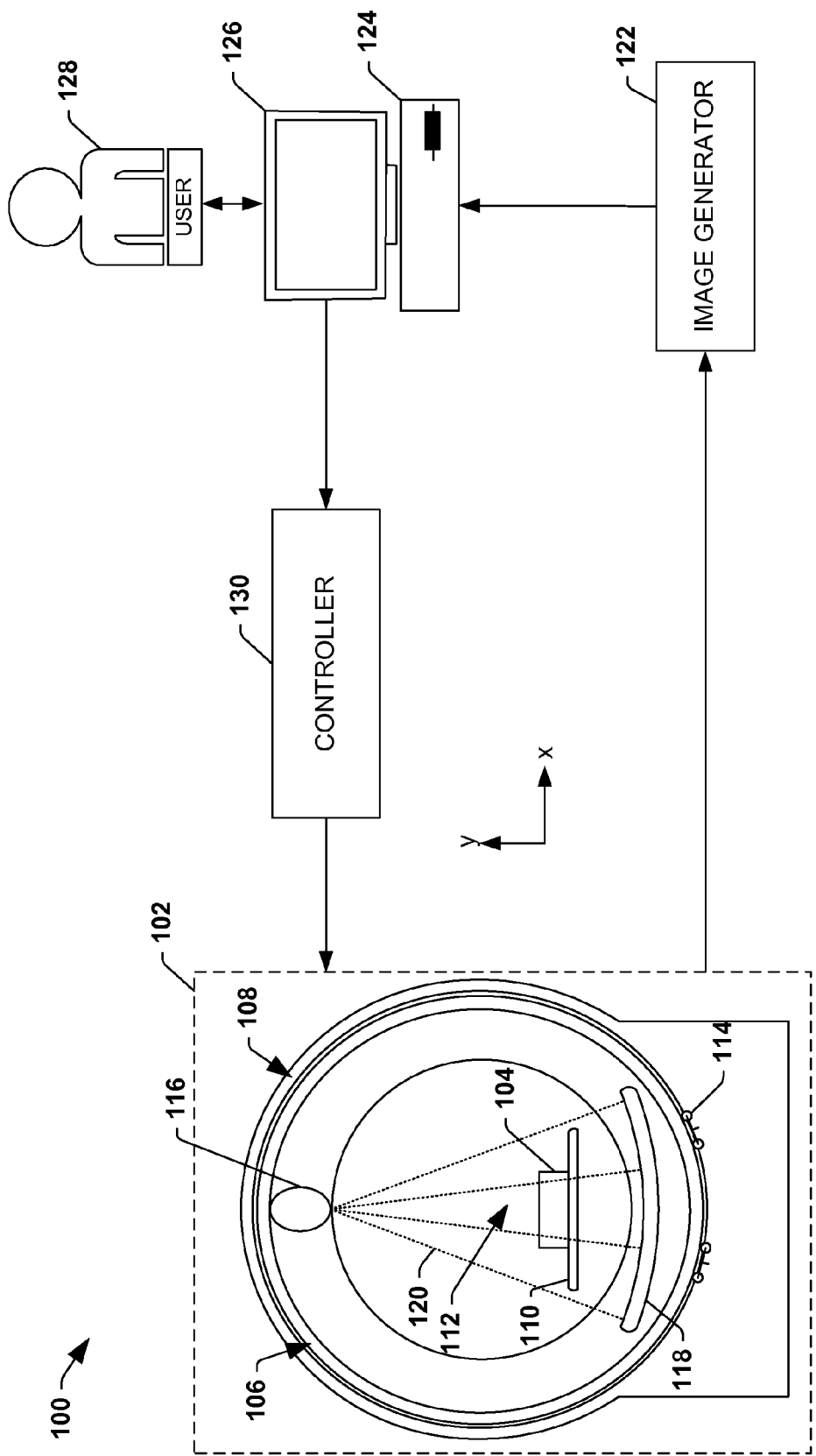
FIG. 1 illustrates an example environment of a radiation imaging modality.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

It may be appreciated that aspects of the disclosure which refer to a first element as being above a second element and/or the first element as being on top of the second element is intended to refer to the position of the first element relative to the second element with respect to the radiation source. For example, the first element is above the second element when radiation emitted from the radiation source would traverse the first element before the second element. Likewise, the first element is said to be below the second element or near a bottom of the second element when radiation emitted from the radiation source would traverse the second element before the first element.

Among other things, a detector unit (e.g., also referred to as a tile, detector tile and/or the like) for a detector array of a radiation imaging modality is provided herein. The detector unit may comprise one or more detector cells respectively configured to detect radiation impinging a region occupied by the detector cell. In some embodiments, the detector cells are configured to detect radiation via an indirect conversion technique (e.g., where the radiation is converted into light energy which is then converted into electrical energy).

In some embodiments, the detector unit comprises a radiation detection sub-assembly and an electronics sub-assembly. The radiation detection sub-assembly is configured to, among other things, detect radiation and generate an analog signal indicative of the detected radiation. By way of example, the radiation detection sub-assembly may comprise a scintillator configured to convert detected radiation into luminescent photons and a plurality of photodetectors (e.g., where one photodetector generally corresponds to one detector cell) respectively configured to detect luminescent photons within a particular spatial region and to generate an analog signal indicative of the detected light energy. The electronics sub-assembly is configured to, among other things, process the analog signals by filtering and/or digitizing the analog signals. By way of example, the electronics sub-assembly may comprise electronic circuitry, including an A/D converter, configured to convert analog signals generated by respective photodetectors into digital signals.

In some embodiments, the electronics sub-assembly comprises a ball grid array (BGA) package and the electronic circuitry corresponds to a die within the BGA package. In such a BGA package, the electronic circuitry is embedded within a molding compound (e.g., a plastic or other dielectric) to encapsulate the A/D converter, and connections are formed from the electronic circuitry to at least two surfaces of the BGA package. A first set of one or more connections extends from the electronic circuitry to a first surface of the BGA package and electrically couples the electronic circuitry to the photodetectors (e.g., to provide the analog signals to the A/D converter). A second set of one or more connections extends from the electronic circuitry to a second surface of the BGA package (e.g., diametrically opposing the first surface) and electrically couples the electronic circuitry to digital processing components (e.g., to provide digital signals generated at the A/D to the digital processing components). In some embodiments, at least some connections of the second set comprise through-mold vias which physically couple and/or electrically couple with a substrate of the BGA package.

In some embodiments, a detector unit is one-side abuttable, two-side abuttable, three-side abuttable, four-side abuttable, etc. to facilitate the development of a detector array having a desired shape and comprising a plurality of detector units. For example, a detector array may comprise 100 or more detector units that have been tiled or arrayed (e.g., arranged in rows and/or columns), where the number of detector units may depend upon, among other things, the number of concurrent image slices that are desirable, the speed of object translation, speed of rotation by a rotating gantry comprising the detector array, etc. In other embodiments, a detector array may comprise a single detector unit.

It may be appreciated that by packaging the electronics sub-assembly, including a substrate to be electrically coupled and/or physically coupled to the photodetector array and the electronic circuitry, as an integral structural element, the electronics sub-assembly may be joined to the radiation detection sub-assembly during an assembly process where the photodetector array is electrically and/or physically coupled to the electronics sub-assembly. Further, as will be described below, the electronics sub-assembly may comprise an electrical coupling element (e.g., a via, cable, pin, etc.) that facilitates coupling the electronics sub-assembly to a substrate for routing signals from the electronic circuitry to other components of the radiation imaging modality (e.g., such as an image generator). In some embodiments, the electronics sub-assembly may be coupled to the photodetector array and/or to the substrate in such a manner that the electronics sub-assembly may be selectively decoupled from the photodetector array and/or the substrate (e.g., to facilitate replacement of the radiation detection sub-assembly, electronics sub-assembly, etc.).

FIG. 1 illustrates an example environment 100 of a computed tomography (CT) system comprising one or more detector units as provided herein. It may be appreciated that while the applicability of such detector units to a CT system is described herein, such detector units may also find applicability in other radiation imaging modalities. For example, the detector units may find applicability with line-scan systems, digital projection systems, diffraction systems, and/or other systems comprising a radiation detecting detector array. Moreover, it may be appreciated that the example environment 100 merely provides an example arrangement and is not intended to be interpreted in a limiting manner, such as necessarily specifying the location, inclusion, and/or relative position of the components depicted therein.

In the example environment 100, the object examination apparatus 102 is configured to examine one or more objects 104 (e.g., a series of suitcases at an airport, a human patient, etc.). The object examination apparatus 102 can comprise a rotor 106 and a stator 108. During an examination of the object(s) 104, the object(s) 104 can be placed on a support article 110, such as a bed or conveyor belt, that is selectively positioned in an examination region 112 (e.g., a hollow bore in the rotor 106 in which the object(s) 104 is exposed to radiation 120), and the rotor 106 can be rotated about the object(s) 104 by a rotator 114 (e.g., motor, drive shaft, chain, etc.).

The rotor 106 can surround a portion of the examination region 112 and can comprise one or more radiation sources 116 (e.g., an ionizing x-ray source, gamma-ray source, etc.) and a detector array 118 that is mounted on a substantially diametrically opposite side of the rotor 106 relative to the radiation source(s) 116. During an examination of the object(s) 104, the radiation source(s) 116 emits fan and/or cone shaped radiation 120 configurations into the examination region 112 of the object examination apparatus 102. It may be appreciated that such radiation 120 can be emitted substantially continuously and/or can be emitted intermittently (e.g., a short pulse of radiation 120 is emitted followed by a resting period during which the radiation source(s) 116 is not activated).

As the emitted radiation 120 traverses the object(s) 104, the radiation 120 can be attenuated differently by different aspects of the object(s) 104. Because different aspects attenuate different percentages of the radiation 120, an image(s) can be generated based upon the attenuation, or variations in the number of radiation photons that are detected by the detector array 118. For example, more dense aspects of the object(s) 104, such as a bone or metal plate, can attenuate more of the radiation 120 (e.g., causing fewer photons to be detected by the detector array 118) than less dense aspects, such as skin or clothing.

The detector array 118 may be configured to indirectly convert (e.g., using a scintillator and photodetectors) detected radiation into analog signals. As will be described in more detail below, the detector array 118 may also comprise electronic circuitry, such as an analog-to-digital (A/D) converter, configured to filter the analog signals, digitize the analog signals, and/or otherwise process the analog signals and/or digital signals generated therefrom. Digital signals output from the electronic circuitry may be conveyed from the detector array 118 to digital processing components configured to store data associated with the digital signals and/or further process the digital signals.

In some embodiments, the digital signals are transmitted to an image generator 122 configured to generate image space data, also referred to as images, from the digital signals using a suitable analytical, iterative, and/or other reconstruction technique (e.g., backprojection reconstruction, tomosynthesis reconstruction, iterative reconstruction, etc.). In this way, the data is converted from projection space to image space, a domain that may be more understandable by a user 128 viewing the image(s), for example. Such image space data may depict a two dimensional representation of the object 104 and/or a three dimensional representation of the object 104. In other embodiments, the digital signals are transmitted to other digital processing components, such as a threat analysis component, for processing.

The example environment 100 also comprises a terminal 124, or workstation (e.g., a computer), configured to receive the image(s), which can be displayed on a monitor 126 to the user 128 (e.g., security personnel, medical personnel, etc.). In this way, a user 128 can inspect the image(s) to identify areas of interest within the object(s) 104. The terminal 124 can also be configured to receive user input which can direct operations of the object examination apparatus 102 (e.g., a speed of a conveyor belt, activation of the radiation source(s) 116, etc.).

In the example environment 100, a controller 130 is operably coupled to the terminal 124. The controller 130 may be configured to control operations of the object examination apparatus 102, for example. By way of example, in some embodiments, the controller 130 is configured to receive information from the terminal 124 and to issue instructions to the object examination apparatus 102 indicative of the received information (e.g., adjust a speed of a conveyor belt).

Figure 2:
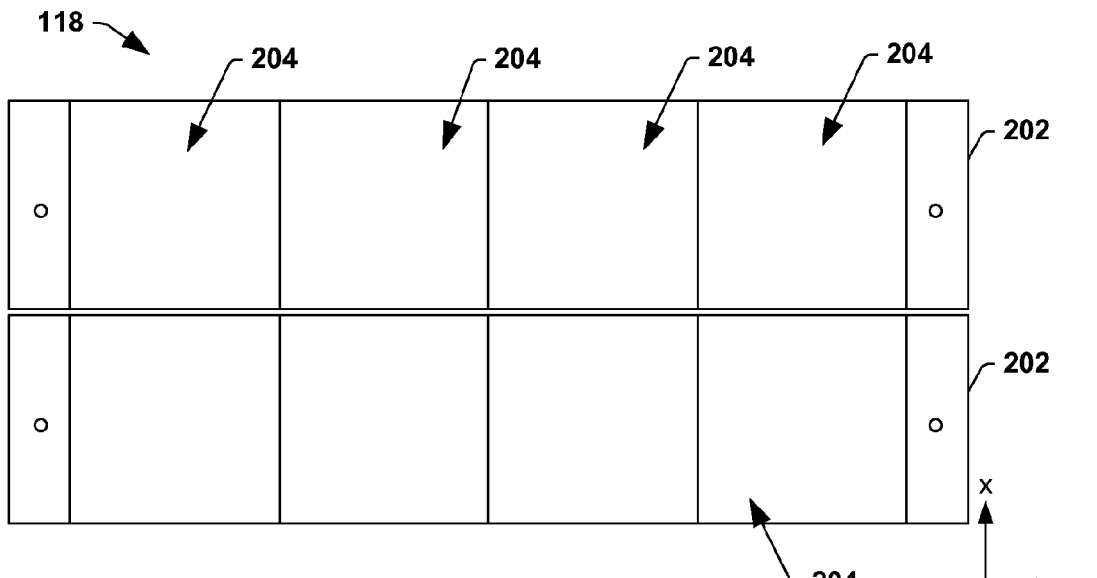
FIG. 2 illustrates a top-down view of a portion of an example detector array.

FIG. 2 illustrates a top-down view of a portion of an example detector array 118 (e.g., a view of the detector array 118 from the perspective of the radiation source(s) 116). In the illustrated embodiment, the detector array 118 comprises a plurality of detector modules 202. Respective detector modules 202 comprise one or more rows and/or columns of detector units 204, and respective detector units 204 comprise one or more detector cells. For example, in a typical configuration, a detector unit 204 may comprise 256 (e.g., 16×16) or more detector cells and a detector module 202 may comprise 4 or more detector units 204. It may be appreciated that the number of detector cells per detector unit 204, the number of detector units 204 per detector module 202, and/or the arrangement of such detector units 204 on a detector module 202 may vary based upon design considerations for a particular application (e.g., desired width of detector array 118, desired length of detector array 118, desired resolution, rotating gantry speed, object translation speed, etc.). It may also be appreciated that while the illustrated embodiment illustrates respective detector modules 202 as comprising a plurality of detector units 204, in other embodiments, one or more detector modules 202 of the detector array 118 may comprise merely one detector unit 204.

Figure 3:
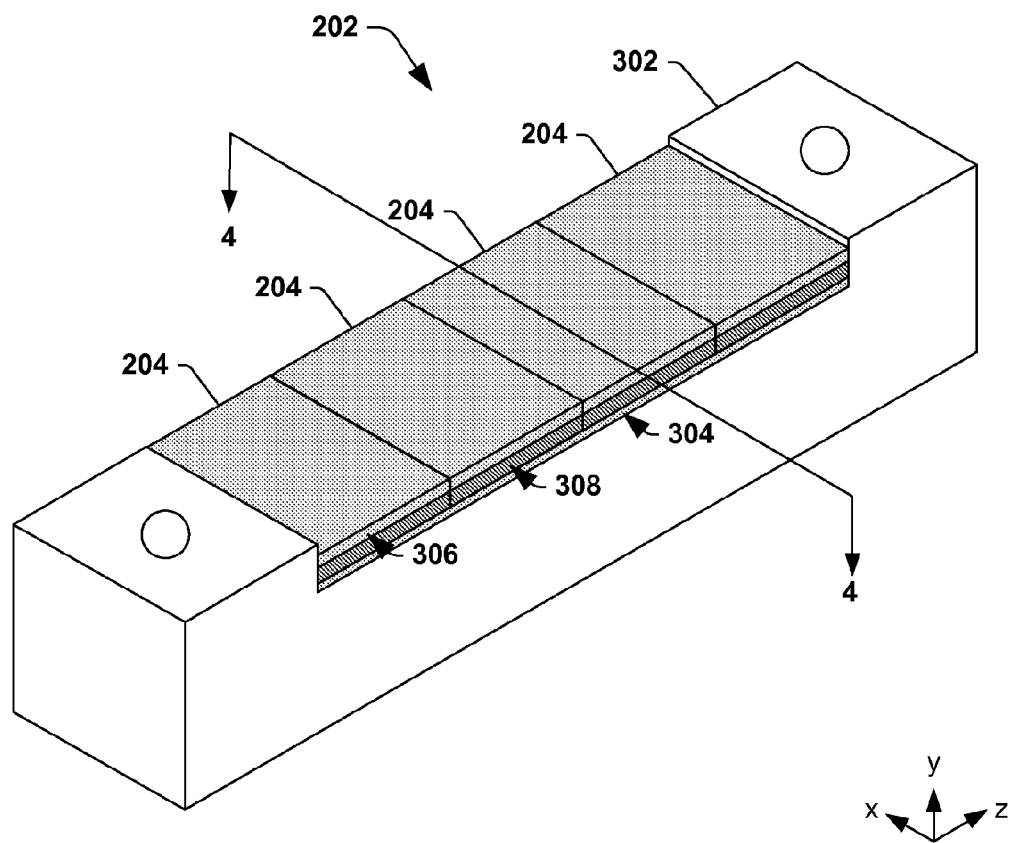
FIG. 3 illustrates a three-dimensional perspective view of an example detector module.

FIG. 3 illustrates a three-dimensional perspective view of an example detector module 202. The detector module 202 comprises a mounting bracket 302, a substrate 304, and a plurality of detector units 204. The substrate 304 (e.g., a printed circuit board (PCB)) comprises one or more channels through which communication signals and/or power signals may be conveyed and is configured to electrically couple the detector units 204 of the detector module 202 together and/or to electrically couple respective detector units 204 to one or more digital processing components (e.g., such as an image generator 122 and/or a threat analysis component). The substrate 304 and/or respective detector units 204 may be physically coupled and/or thermally coupled to the mounting bracket 302 via an adhesive, fastener, etc. and the mounting bracket 302 may be physically coupled to other detector modules 202 and/or to the rotor 106 to form the detector array 118, for example.

Respective detector units 204 comprise a radiation detection sub-assembly 306 (e.g., represented by the lighter shade of grey) and an electronics sub-assembly 308 (e.g., represented by the dark shade of grey). As will be further described in more detail below, the radiation detection sub-assembly 306 comprises one or more elements configured to detect radiation and/or to generate analog signals indicative of the detected radiation, and the electronics sub-assembly 308 comprises one or more elements configured to process the analog signals (e.g., convert the analog signals to digital signals, filter the analog signals and/or digital signals, etc.).

Figure 4:
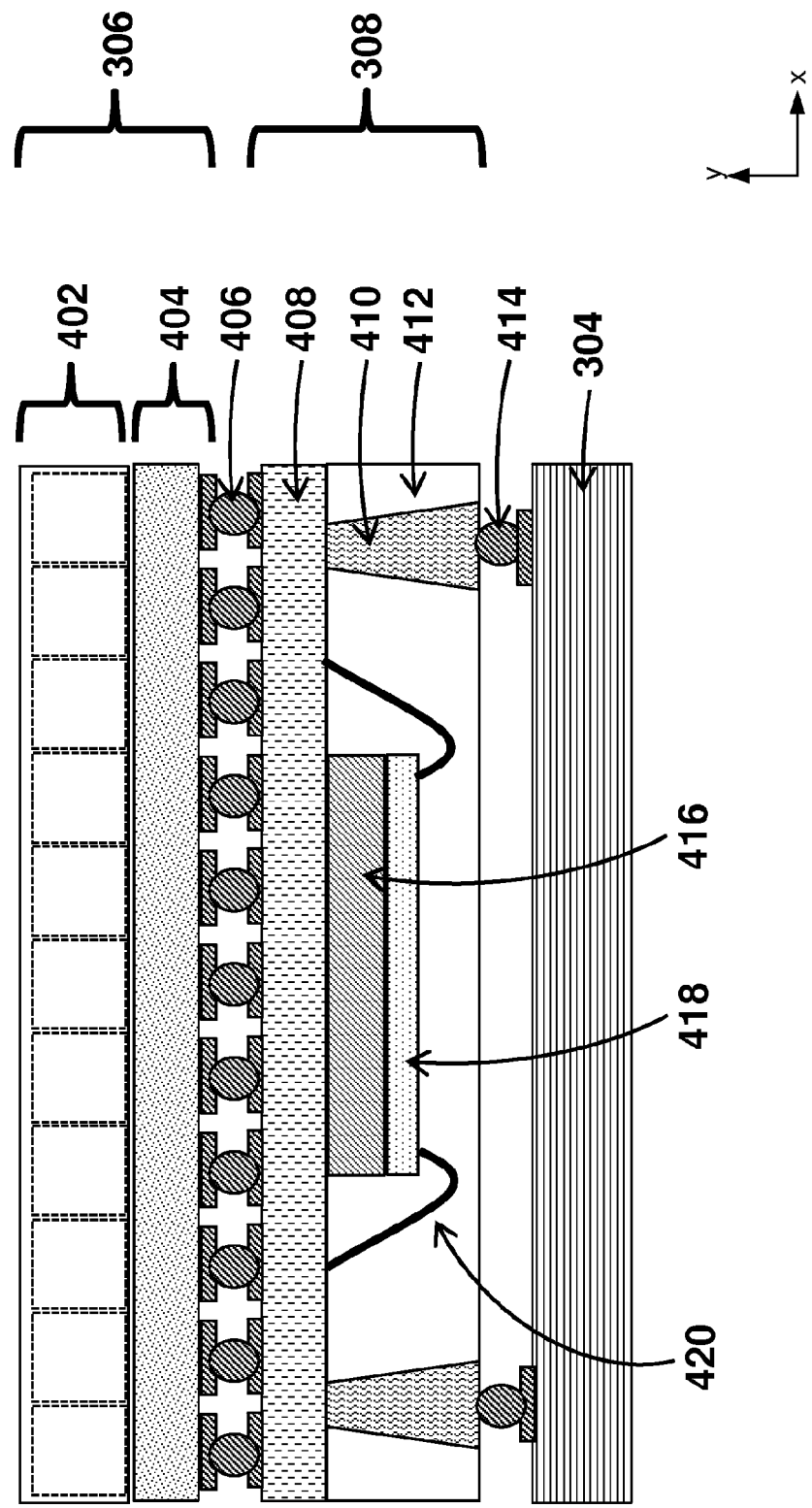
FIG. 4 illustrates a cross-sectional view of an example detector unit.

Referring to FIG. 4, a cross-sectional view of an example detector unit 204 (e.g., taken along line 4-4 in FIG. 3) comprising the substrate 304, a radiation detection sub-assembly 306, and an electronics sub-assembly 308 is provided. The cross-sectional view does not depict the mounting bracket 302, although one may be present.

The radiation detection sub-assembly 306 is physically coupled and/or electrically coupled to the electronics sub-assembly 308 via a first interconnection layer 406. A second interconnection layer 414, below the electronics sub-assembly 308, physically couples and/or electrically couples the electronics sub-assembly 308 to the substrate 304. In some embodiments, the substrate 304 comprises one or more channels through which power and/or data is routed to the electronics sub-assembly 308. In some embodiments, the substrate 304 comprises one or more channels through which data is routed from the electronics sub-assembly 308 to the image generator 122 and/or other digital processing components, for example. The first interconnection layer 406 and the second interconnection layer 414 may comprise contact pads, solder balls, conductive epoxy, electrically conductive spring contacts, and/or other elements configured to form a physical and/or electrical connection between two elements.

The radiation detection sub-assembly 306 is configured to indirectly convert detected radiation into analog signals and comprises a scintillator 402 and a photodetector array 404. The scintillator 402 is positioned in a radiation pathway between the photodetector array 404 and the radiation source 116. Radiation 120 impinging the scintillator 402 is converted into luminescent photons, which can be detected by a photodetector of the photodetector array 404. Example materials for such a scintillator 402 include, among other things, Gadolinium Oxysulfide (GOS), Cadmium Tungstate, Bismuth Germanate, Cesium Iodide, Sodium Iodide, Lutetium Orthosilicate, and/or an amorphous material.

Respective photodetectors of the photodetector array 404 may comprise back-illuminated photodiodes and/or front-illuminated photodiodes, for example, and are configured to detect luminescent photons impinging thereon to generate electrical charge. The electrical charge is periodically sampled to generate an analog signal, which is provided to the electronics sub-assembly 308. Accordingly, respective photodetectors of the photodetector array 404 are configured to generate an analog signal indicative of the amount of light detected by the photodetector between samplings (e.g., which correlates to the amount of radiation detected, between samplings, within a region of the scintillator 402 spatially proximate the photodetector).

The electronics sub-assembly 308 is configured to process the analog signals generated by the radiation detection sub-assembly 306 to generate digital signals. Such processing may include, among other things, filtering the analog signals (e.g., to reduce noise, smooth the signal, enhance aspects of the signal, etc.), converting the analog signals to digital signals, and/or filtering the digital signals.

In the illustrated embodiment, the electronics sub-assembly 308 comprises a second substrate 408, electronic circuitry 418, a first coupling element 420, a second coupling element 410, a shielding element 416, and a molding compound 412. The first coupling element 420 is configured to electrically couple the second substrate 408 to the electronic circuitry 418. In the illustrated embodiment, the first coupling element 420 comprises one or more wirebonds, although as will be evident from the following figures, the first coupling element 420 may comprise other forms of electrical couplers. The second coupling element 410 is configured to electrically couple the second substrate 408 to the second interconnection layer 414. In the illustrated embodiment, the second coupling element 410 comprises one or more through-mold vias that electrically couple and/or physically couple the second substrate 408 to the substrate 304 (e.g., by way of the second interconnection layer 414). In some embodiments, such as illustrated, the through-mold vias of the second coupling element 410 physically contact the second substrate 408 (e.g., including one or more metal lines thereon) and extend through the molding compound 412 to a surface of the electronics sub-assembly 308 opposing the second substrate 408. Although, as will be evident from the following figures, the second coupling element 410 may comprise other forms of electrical couplers.

The second substrate 408 (e.g., a second printed circuit board or other routing element) is disposed between the first interconnection layer 406 and the shielding element 416 and electrically couples the first interconnection layer 406 to the electronics sub-assembly 308. Although not illustrated, the second substrate 408 comprises channels through which the analog signals, yielded from the photodetector array 404, are routed from the first interconnection layer 406 to the first coupling element 420, which routes the analog signals to the electronic circuitry 418.

The shielding element 416 is positioned between the second substrate 408 and the electronic circuitry 418 or a portion thereof (e.g., an A/D converter portion) and is configured to shield the underlying electronic circuitry 418 from radiation emitted by the radiation source 116. A composition of the shielding element 416 and/or a thickness of the shielding element 416 may depend upon a desired radiation attenuation coefficient of the shielding element 416. In some embodiments, the shielding element 416 comprises tungsten, lead, or other elements having a high atomic number (e.g., where a relatively narrow slice of material attenuates nearly 100% of radiation impinging the composition).

The electronic circuitry 418 is disposed below the shielding element 416 and is configured to process the analog signals generated by the photodetector array 404. Such electronic circuitry 418 may include one or more analog-to-digital converters (A/D converters), memory arrays, resistors, capacitors, application-specific integrated circuits (ASICs), field-programmable gate arrays (FGPAs), and/or other electronic devices that are capable of being configured to perform the desired signal processing. In some embodiments, at least some of the electronic circuitry 418, such as the A/D converters, ASICs, etc. may be made of silicon and/or a doped silicon and may be referred to as a silicon die or, more generically, as a die.

It may be appreciated that while all of the electronic circuitry 418 is disposed below the shielding element 416 in FIG. 4, in some embodiments, at least some electronic circuitry 418 (e.g., resistors, capacitors, etc.) may not be disposed below the shielding element 416. For example, some of the electronic circuitry 418 may abut the second substrate 408 (e.g., and not be shielded from radiation by the shielding element 416).

Digital signals output from the electronic circuitry 418 may be provided to the second substrate 408 through other channels of the first coupling element 420 (e.g., that are not used to route the analog signals from the photodetector array 404). Digital signals routed to the second substrate 408 through the first coupling element 420 may be further routed through the second substrate 408, the second coupling element 410, and the second interconnection layer 414 to the substrate 304, which is configured to route the digital signals to digital processing components, such as the image generator 122, for example. Moreover, power and/or information may be provided to the electronic circuitry 418 (e.g., from the controller 130 and/or a power supply) through channels of the substrate 304, the second interconnection layer 414, the second coupling element 410, the second substrate 408, and/or the first coupling element 420.

The molding compound 412 at least partially surrounds and/or at least partially encloses (e.g., encapsulates) the electronic circuitry 418 to form a package, such as a BGA package. In some embodiments, the package further comprises the shielding element 416, the first coupling element 420, and/or the second coupling element 410, which are also at least partially enclosed and/or partially surrounded by the molding compound 412. In some embodiments, such a molding compound 412 may comprise a silicon composition, a plastic polymer, and/or other composition that can be solidified to form a rigid or semi-rigid structure which substantially secures the relative position of the electronic circuitry 418, the shielding element 416, the first coupling element 420, and/or the second coupling element 410. Further, the molding compound 412 may (e.g., rigidly) bond to the second substrate 408 to form a rigid or semi-rigid package that includes the second substrate 408, the shielding element 416, the electronic circuitry 418, the first coupling element 420, and/or the second coupling element 410. In this way, the electronics sub-assembly 308 may comprise a structural element that can be manufactured and subsequently electrically coupled and/or physically coupled to the radiation detection sub-assembly 306 and/or the substrate 304.

Figure 5:
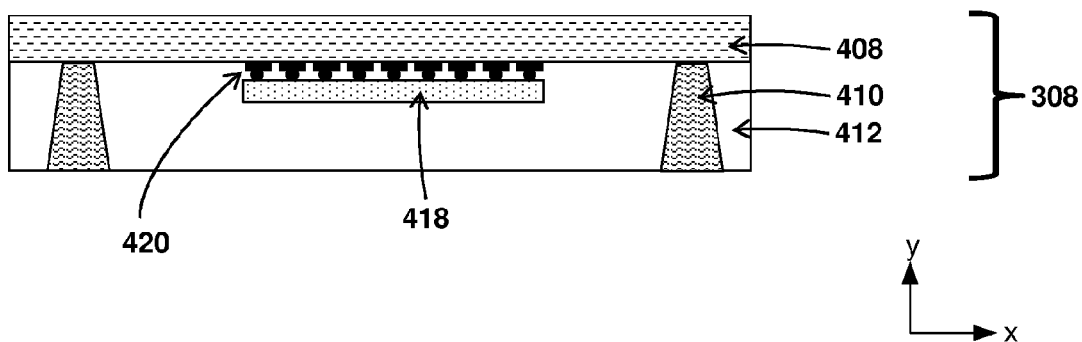
FIG. 5 illustrates a cross-sectional view of an example electronics sub-assembly of a detector unit.

Referring to FIG. 5, another example embodiment of the electronics sub-assembly 308 is provided. In this embodiment, the electronic circuitry 418 comprises a flip-chip and the first coupling element 420 comprises one or more solder balls or other electrically conductive elements (e.g., conductive epoxy bonds) for electrically coupling the second substrate 408 with the electronic circuitry 418 (e.g., where the solder balls or other electrically conductive elements replace the wirebonds illustrated in FIG. 4).

It may be appreciated that the shielding element 416 is not present in the embodiment illustrated in FIG. 5 because the first coupling element 420 is sandwiched between the second substrate 408 and the electronic circuitry 418 and is electrically coupled to both the second substrate 408 and the electronic circuitry 418. In some such embodiments, other techniques may be applied to mitigate radiation exposure to the electronic circuitry 418. By way of example, the electronic circuitry 418 may be formed according to radiation hardening (rad-hard) techniques such as according to a hardened by design (HBD) technique and/or according to some silicon on insulator (SOI) and/or silicon on sapphire (SOS) techniques. As another example, a shield mask may be positioned at a base of an anti-scatter grid (e.g., positioned between the radiation source 116 and the radiation detection sub-assembly 306). As still another example, a radiation absorbing substrate may be positioned between the photodetector array 404 and the electronics sub-assembly 308.

Referring to FIGS. 6-14, other example embodiments of the electronics sub-assembly 308 providing various arrangements of the second coupling element 410 are provided. It will be appreciated that these figures are merely intended to provide some example configurations for the second coupling element 410 and are not intended to be an exhaustive list. Thus, other forms of electrical couplers that are not illustrated and/or describes herein are also contemplated.

Figure 6:
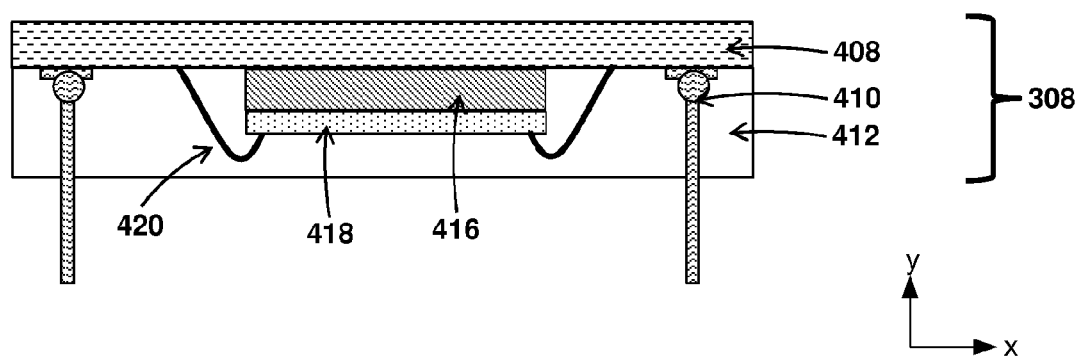
FIG. 6 illustrates a cross-sectional view of an example electronics sub-assembly of a detector unit.

FIG. 6 illustrates an example embodiment of an electronics sub-assembly 308 wherein the second coupling element 410 comprises one or more through-mold pins (e.g., instead of vias as illustrated in FIG. 4). Like the vias, the through-mold pins are configured to route digital signals and/or power between the substrate 304 and the second substrate 408 or rather between the second interconnection layer 414 and the second substrate 408. In some embodiments, the through-mold pins protrude from a bottom surface of the electronics sub-assembly 308 to physically couple and/or electrically couple the electronics sub-assembly 308 to the substrate 304. In such embodiments, where the second coupling element 410 connects directly to the substrate 304, the second interconnection layer 414 may be optional.

Figure 7:
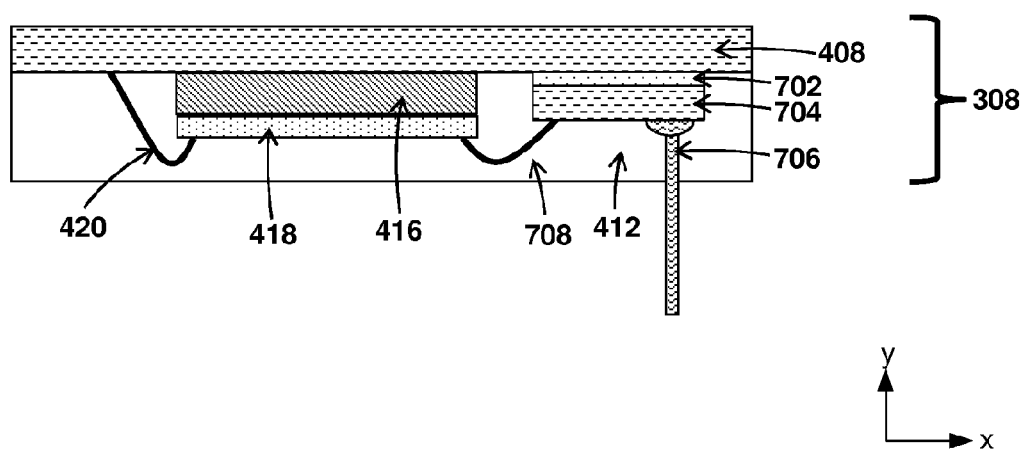
FIG. 7 illustrates a cross-sectional view of an example electronics sub-assembly of a detector unit.

FIG. 7 illustrates an example embodiment of an electronics sub-assembly 308 wherein the second coupling element 410 comprises one or more connection substrates 704 (e.g., a PCB), one or more through-mold pins 706 (e.g., instead of vias as illustrated in FIG. 4), and one or more wirebonds 708. The through-mold pin(s) 706 and the wirebond(s) 708 are electrically coupled to the connection substrate(s) 704. The connection substrate(s) 704 is physically coupled to the second substrate 408 by way of the adhesion layer 702. Power and/or digital signals to be transmitted between the electronic circuitry 418 and the substrate 304 may be routed through one or more channels formed by a wirebond 708, the connection substrate 704, and a through-mold pin 706. In some embodiments, the digital signals and/or power signals may bypass the second substrate because the wirebond(s) 708 are electrically coupled directly to the connection substrate(s) 704 (e.g., mitigating possible cross-talk between the analog signals through the second substrate 408 and the digital signals and/or power signals). In some embodiments, the through-mold pin(s) 706 protrude from a bottom surface of the electronics sub-assembly 308 to physically couple and/or electrically couple the electronics sub-assembly 308 to the substrate 304. In such embodiments, where the second coupling element 410 connects directly to the substrate 304 by way of the through-mold pin(s), the second interconnection layer 414 may be optional.

Figure 8:
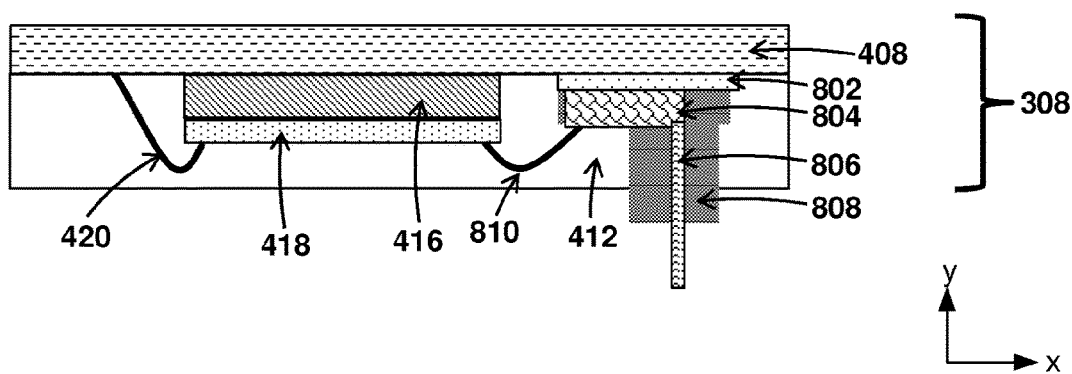
FIG. 8 illustrates a cross-sectional view of an example electronics sub-assembly of a detector unit.
Figure 9:
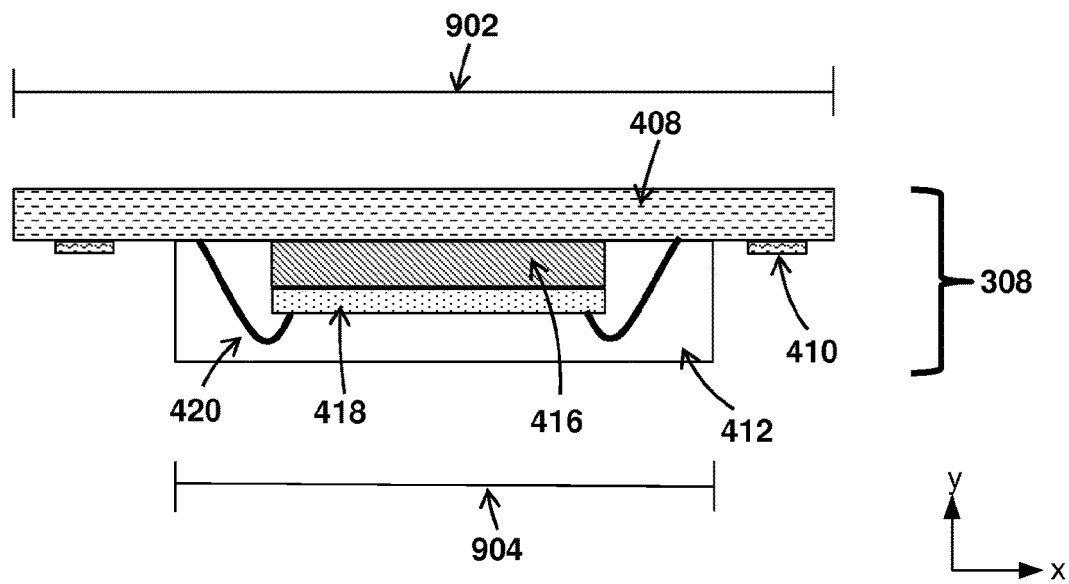
FIG. 9 illustrates a cross-sectional view of an example electronics sub-assembly of a detector unit.

FIG. 8 illustrates an example embodiment of an electronics sub-assembly 308 wherein the second coupling element 410 comprises one or more connection assemblies (e.g., instead of vias as illustrated in FIG. 4) and one or more wirebonds 708. In some embodiments, the respective connection assemblies comprise a connection pad 804, a pin 806, and an insulator 808, which surrounds the connection pad 804 and/or the pin 806. A wirebond 810 and the pin 806 are electrically coupled to the connection pad 804, which is physically coupled to the second substrate 408 by way of an adhesion layer(s) 802. Power and/or digital signals to be transmitted between the electronic circuitry 418 and the substrate 304 may be routed through one or more channels formed by a wirebond 810, the connection pad 804, and a pin 806. In some embodiments, the pin 806 of a connection assembly protrudes from a bottom surface of the electronics sub-assembly 308 to physically couple and/or electrically couple the electronics sub-assembly 308 to the substrate 304. In such embodiments, where the second coupling element 410 connects directly to the substrate 304 through the pin(s) 806, the second interconnection layer 414 may be optional.

In some embodiments, the second substrate 408 may be sized differently than the molding compound 412. By way of example, a length (e.g., in a z-direction going into and out of the page) and/or a width of the second substrate 408 may be greater than a length and/or a width of the molding compound 412 that encapsulates the shielding element 416, the electronic circuitry 418, and/or the first coupling element 420. Accordingly, a portion of the second substrate 408 may physically contact the molding compound 412 while a second portion of the second substrate may not physically contact the molding compound 412. As an example, referring to FIG. 9, a width 902 of the second substrate 408 is greater than a width 904 of the molding compound 412, causing a portion of the second substrate 408 to physically contact the molding compound 412 and a second portion of the second substrate 408 to not physically contact the molding compound 412 (e.g., thus exposing a bottom portion of the second substrate 408).

In embodiments where the width 902 of the second substrate 408 is greater than the width 904 of the molding compound 412 or the length of the second substrate 408 is greater than a length of the molding compound 412, the second coupling element 410 may be disposed external to the molding compound 412. By way of example, in the embodiment illustrated in FIG. 9, the second coupling element 410 comprises a contact pad disposed on a bottom surface of the second substrate (e.g., disposed along a same surface as the molding compound 412). The contact pad is external to the molding compound 412 and is configured to be electrically coupled to a cable, pin, etc. disposed on the substrate 304, for example, to route power and/or data from and/or to the second substrate 408.

Figure 10:
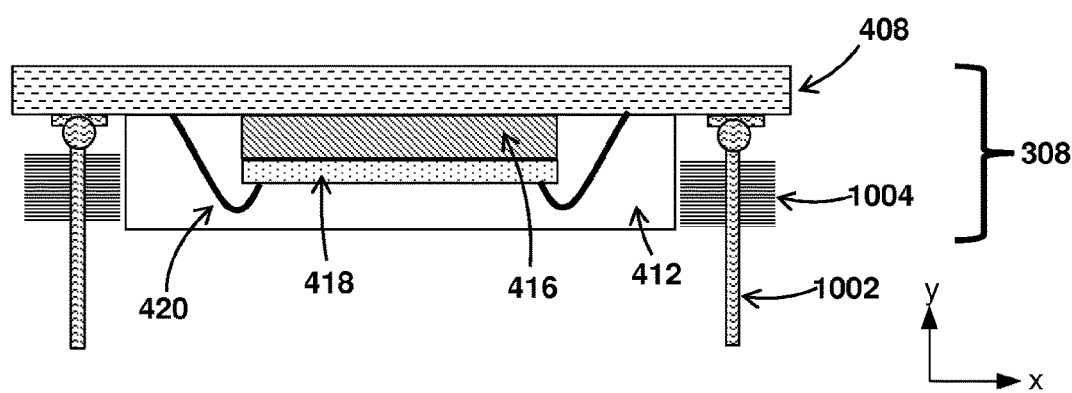
FIG. 10 illustrates a cross-sectional view of an example electronics sub-assembly of a detector unit.

FIG. 10 illustrates another example embodiment of the electronics sub-assembly 308 wherein the width of the second substrate 408 is greater than the width of the molding compound 412 and the second coupling element 410 is disposed external to the molding compound 412. In this example embodiment, the second coupling element 410 comprises a connector assembly comprising a pin 1002 and an insulator 1004 which (e.g., optionally) surrounds the pin 1002. In some embodiments, the insulator 1004 may provide support for the pin 1002. By way of example, the insulator 1004 may abut or contact a surface of the molding compound 412 to inhibit relative motion between the pin 1002 and the compound molding 412. Further, the insulator 1004 may physically couple the pin 1002 to other pins connected to the detector unit 204, for example (e.g., where the other pins provide additional channels through which power signals and/or digitals signals may be routed). In some embodiments, the pin 1002 physically couples and/or electrically couples the electronics sub-assembly 308 to the substrate 304 and thus the second interconnection layer 414 may be optional.

Figure 11:
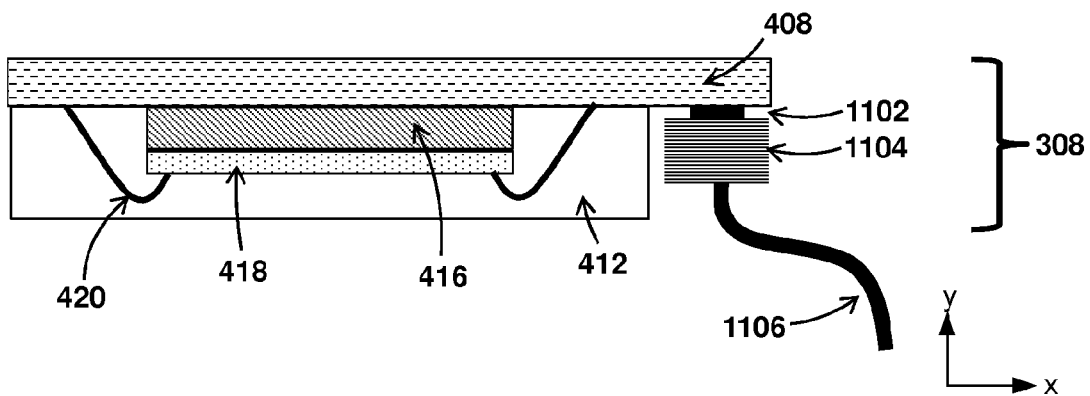
FIG. 11 illustrates a cross-sectional view of an example electronics sub-assembly of a detector unit.

FIG. 11 illustrates another example embodiment of the electronics sub-assembly 308 wherein the width of the second substrate 408 is greater than the width of the molding compound 412 and the second coupling element 410 is disposed external to the molding compound 412. In this example embodiment, the second coupling element 410 comprises a cable assembly comprising an adhesion layer 1102, a connector 1104, and a cable 1106. The cable 1106 is physically coupled and/or electrically coupled to the connector 1104, and the connector 1104 is physically coupled and/or electrically coupled to the second substrate 408 by way of the adhesion layer 1102. In some embodiments, the adhesion layer 1102 may be replaced with an electrical fastener or solder joint, for example, that couples the connector 1104 to the substrate 408. In some embodiments, the cable 1106 physically couples and/or electrically couples the electronics sub-assembly 308 to the substrate 304 and thus the second interconnection layer 414 may be optional.

Figure 12:
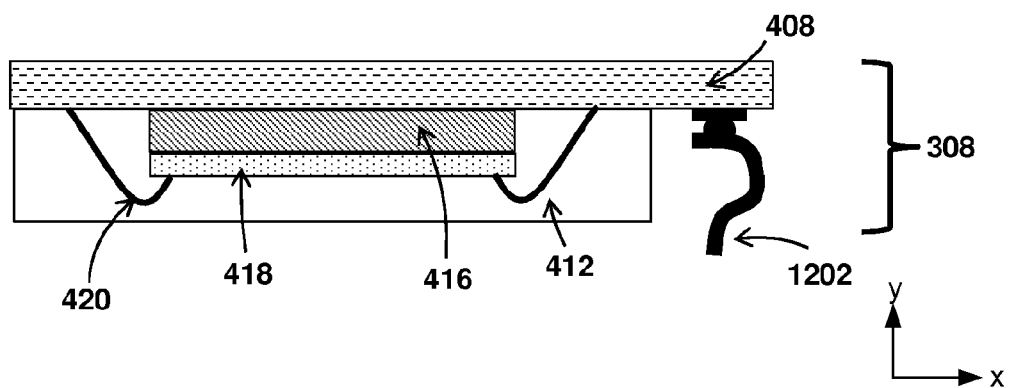
FIG. 12 illustrates a cross-sectional view of an example electronics sub-assembly of a detector unit.

FIG. 12 illustrates another example embodiment of the electronics sub-assembly 308 wherein the width of the second substrate 408 is greater than the width of the molding compound 412 and the second coupling element 410 is disposed external to the molding compound 412. In this example embodiment, the second coupling element 410 comprises a cable 1202 that is physically coupled and/or electrically coupled to the second substrate 408 using a solder bond, anisotropic conductive film (ACF) bond, conductive epoxy bond, or other bonding element. It may be appreciated that a solder bond, an ACF bond, and a conductive epoxy bond are merely example techniques for coupling the cable 1202 to the second substrate 408 and that other techniques are also contemplated. In some embodiments, the cable 1202 physically couples and/or electrically couples the electronics sub-assembly 308 to the substrate 304 and thus the second interconnection layer 414 may be optional.

Figure 13:
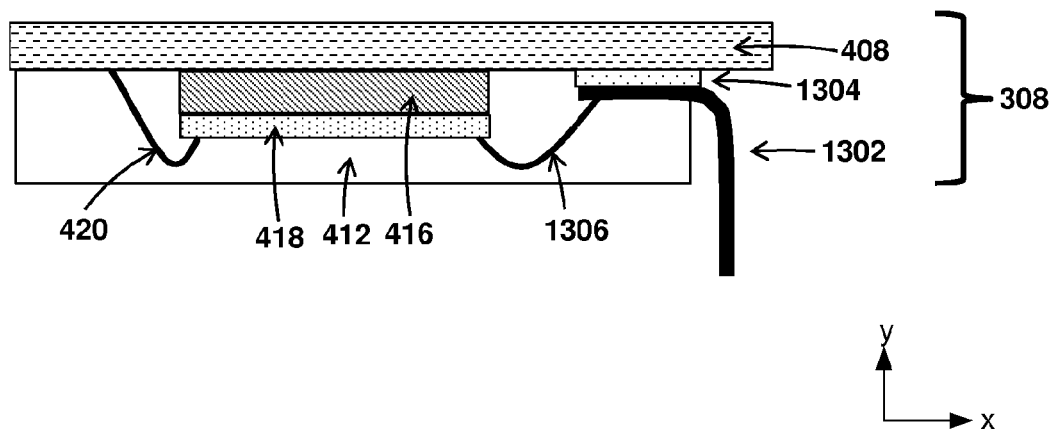
FIG. 13 illustrates a cross-sectional view of an example electronics sub-assembly of a detector unit.

FIG. 13 illustrates yet another example embodiment of the electronics sub-assembly 308 wherein the width of the second substrate 408 is greater than the width of the molding compound 412. In this embodiment, the second coupling element 410 comprises a cable 1302 and a wirebond 1306 that is electrically coupled to the cable 1302 (e.g., and may be integral with the cable such that the wirebond 1306 is merely a portion of the cable 1302). Power and/or digital signals to be transmitted between the electronic circuitry 418 and the substrate 304 may be routed through one or more channels formed by the wirebond 1306 and the cable 1302 (e.g., thus avoiding the second substrate 408).

The second coupling element 410 is physically coupled to the second substrate 408 by way of an adhesion layer 1304.

In some embodiments, a portion of the cable 1302 is disposed within the molding compound 412 while another portion of the cable 1302 is disposed external to the molding compound 412. In some embodiments, the cable 1302 physically couples and/or electrically couples the electronics sub-assembly 308 to the substrate 304 and thus the second interconnection layer 414 may be optional.

Figure 14:
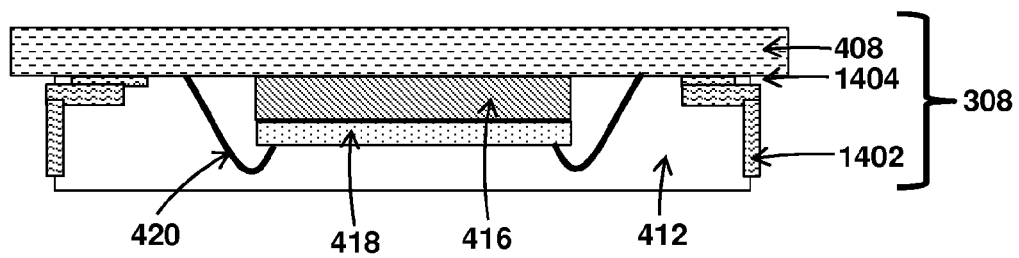
FIG. 14 illustrates a cross-sectional view of an example electronics sub-assembly of a detector unit.

FIG. 14 illustrates yet another example embodiment of the electronics sub-assembly 308 wherein the width of the second substrate 408 is greater than the width of the molding compound 412. In this embodiment, the second coupling element 410 comprises a connection assembly comprising a side-facing contact pad 1402 and an adhesion layer 1404. The second substrate 408 is electrically coupled to the side-facing contact pad 1402 via the adhesion layer 1404. In embodiments where the second coupling elements comprises a connection assembly having a side-facing contact pad 1402, the substrate 304 and/or the second interconnection layer 414 may comprise a conductive tab that protrudes from an upper surface of the substrate 304 and/or an upper surface of the second interconnection layer 414 to contact the side-facing contact 1402, for example.

Figure 15:
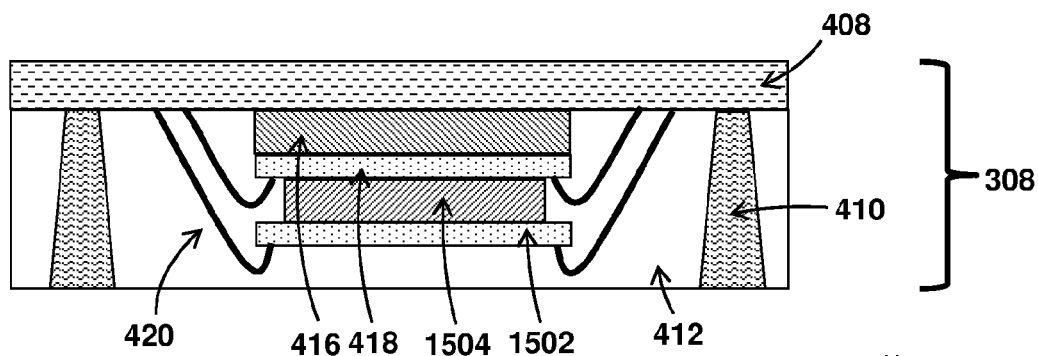
FIG. 15 illustrates a cross-sectional view of an example electronics sub-assembly of a detector unit.

While FIGS. 4-14 illustrate the electronics sub-assembly 308 as comprising merely a single set of electronic circuitry 418, in some embodiments, the electronics sub-assembly 308 may comprise multiple sets of electronic circuitry 418 and/or multiple die. For example, referring to FIG. 15, an example embodiment of an electronics sub-assembly 308 comprising multiple sets of electronic circuitry 418, 1502 is illustrated. A first set of electronic circuitry 418 and a second set of electronic circuitry 418 may perform similar functions or different functions. For example, the first set of electronic circuitry 418 may comprise a first A/D converter for converting analog signals generated by a first set of photodetectors of the photodetector array 404 to digital signals and the second set of electronic circuitry 1502 may comprise a second A/D converter for converting analog signals generated by a second set of photodetectors of the photodetector array 404 to digital signals. As another example, the first set of electronic circuitry 418 may be configured to convert analog signals to digital signals while the second set of electronic circuitry 1502 comprises memory configured to store at least some data associated with the digital signals. The first set of electronic circuitry 418 and the second set of electronic circuitry 1502 may be electrically coupled to the second substrate 408 via the first coupling element 420 (e.g., where wirebonds are shown extending from the second substrate 408 to respective sets of electronic circuitry 418, 1502).

In some embodiments, the second set of electronic circuitry 1502 is disposed below the first set of electronic circuitry 418 such that the shielding element 416 shields both sets of electronic circuitry 418, 1502 from radiation. Moreover, in some embodiments, a substantially non-conductive spacer 1504 is disposed between the first set of electronic circuitry 418 and the second set of electronic circuitry 1502. Such a non-conductive spacer 1504 may be configured to mitigate heat transfer between the two sets of electronic circuitry 418, 1502 and/or may be configured to electrically isolate the two sets of electronic circuitry 418, 1502 from one another, for example.

Figure 16:
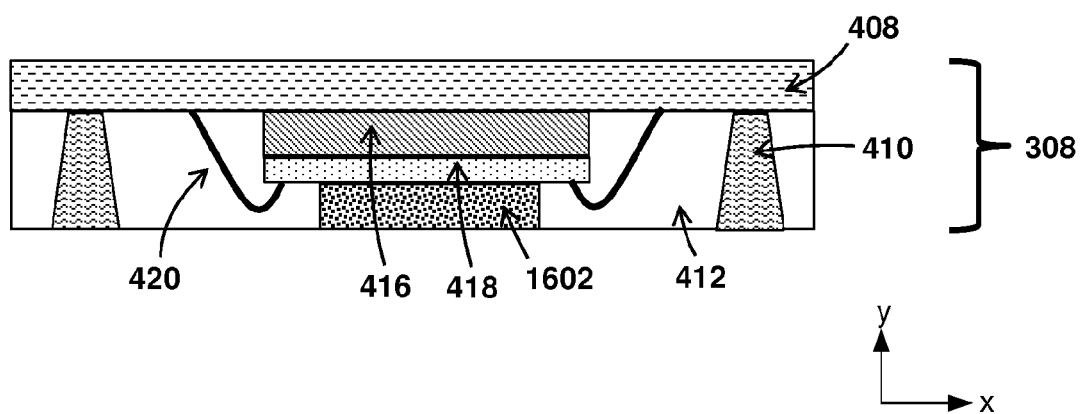
FIG. 16 illustrates a cross-sectional view of an example electronics sub-assembly of a detector unit.

FIG. 16 illustrates yet another example embodiment of the electronics sub-assembly 308, wherein a thermal conduction element 1602 (e.g., a heat sink) is situated below the electronic circuitry 418 and/or adjacent to the electronic circuitry 418. As will be further described with respect to FIG. 21, in some embodiments the thermal conduction element 1602 extends to a bottom surface of the electronics sub-assembly 308 to facilitate thermally coupling the thermal conduction component 1602 to a temperature regulation mechanism (e.g., such as a portion of the mounting bracket 302, a heat exchanger, etc.).

The thermal conduction element 1602 is thermally coupled to the electronic circuitry 418 (e.g., via a thermally conductive gel, metal contact pads, etc.) and is configured to control a temperature of the electronic circuitry 418. That is, stated differently, the thermal conduction element 418 is configured to substantially maintain the electronic circuitry 418 and/or elements thereof (e.g., A/D converters, ASICs, FGPAs, etc.) at a desired temperature or temperature range by removing heat from the electronic circuitry 418 if a temperature of the electronic circuitry 418 exceeds a desired high temperature threshold and/or by applying heat to the electronic circuitry 418 if a temperature of the electronic circuitry 418 is below a desired low temperature threshold, for example. In this way, the thermal conduction element 1602 may be configured to dissipate heat generated by elements of the electronic circuitry 418, such as an A/D converter and/or FGPA, and/or to apply heat to such elements, for example.

Figure 17:
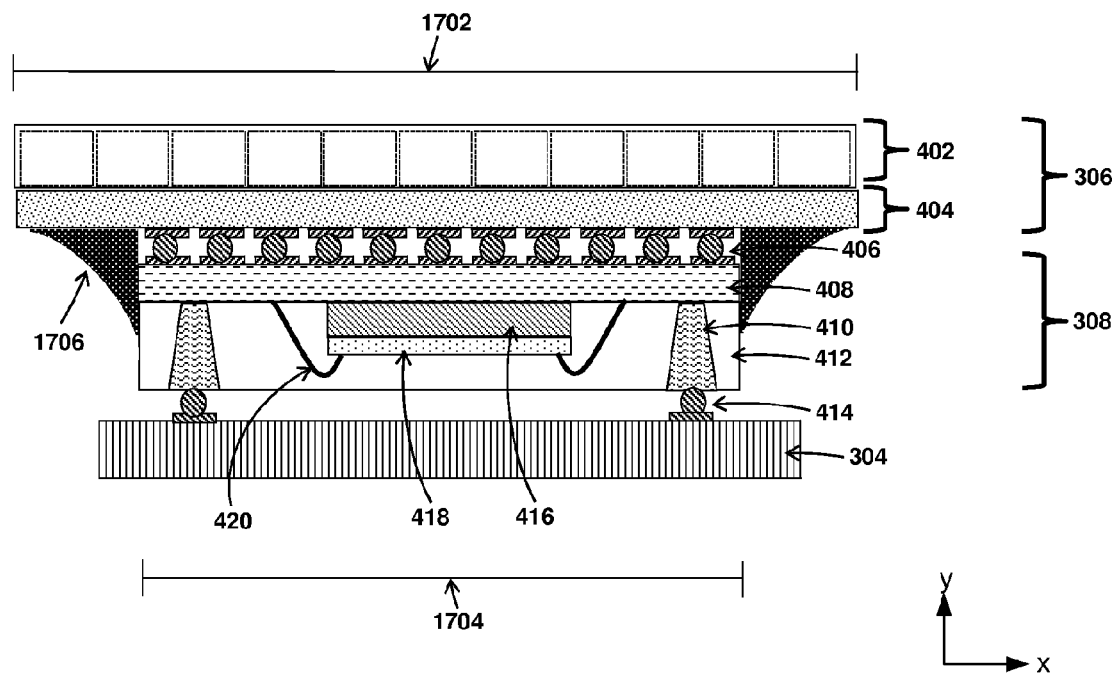
FIG. 17 illustrates a cross-sectional view of an example detector unit.

While FIG. 4 illustrates the radiation detection sub-assembly 306 as having a width (e.g., measured in the x-direction) that is substantially equal to a width of the molding compound 412, in other embodiments, a width of the radiation detection sub-assembly 306 may be different than a width of the molding compound 412. By way of example, referring to FIG. 17, the radiation detection sub-assembly 306 has a width 1702 that is greater than a width 1704 of the molding compound 412 such that the photodetector array 404 overhangs the molding compound 412. In some embodiments, the width 1702 of the radiation detection sub-assembly 306 may be application specific and the width 1704 of the electronics sub-assembly 308 may be application independent. In such embodiments, the radiation detection sub-assembly 306 that is selected for coupling to the electronics sub-assembly 308 may be based upon the intended application. For example, a plurality of sized radiation detection sub-assembly 306 may be manufactured and the width 1704 of the molding compound 412 may be selected to correspond to a radiation detection sub-assembly 306 of the plurality having the smallest width. Moreover, in some embodiments, a length (e.g., measured in a z-direction, not shown) of the molding compound 412 may be selected to correspond to a radiation detection sub-assembly 306 of the plurality having a smallest length. In this way, the molding compound 412 may be sized to accommodate a plurality of various sized radiation detection sub-assemblies 306.

Further, it may be appreciated that due to, among other things, a fragile nature of the photodetector array 404, in some embodiments, the electronics sub-assembly 308 may further comprise a photodetector support feature 1706. Such a photodetector support feature 1706 may comprise a glue fillet, metal brace, plastic brace, etc. and may extend above the first interconnection layer 406. In this way, a portion of the photodetector array 404 may rest upon and/or be physically coupled with the photodetector support feature 1706.

Figure 18:
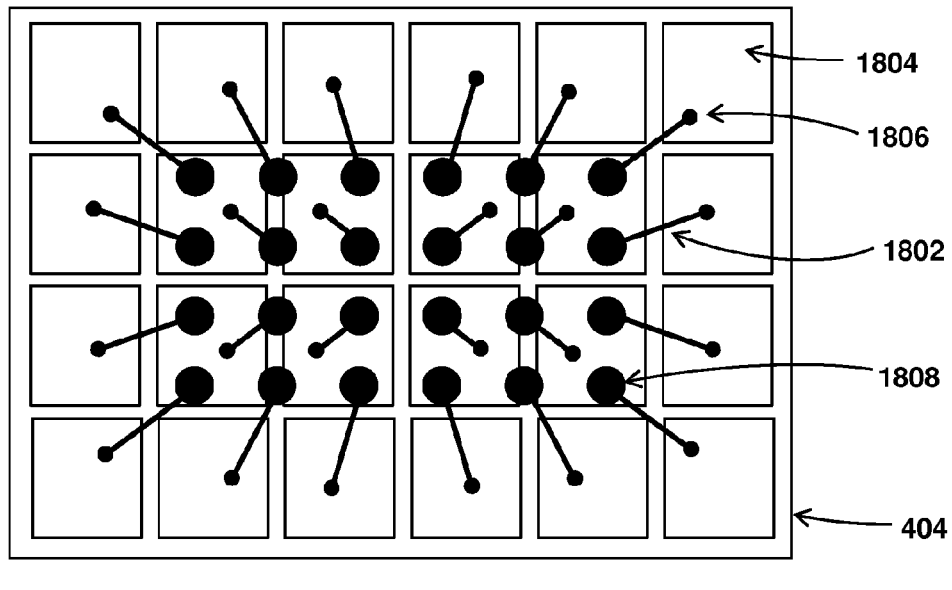
FIG. 18 illustrates a top-down view of an example photodetector array.

In some embodiments where the width 1702 and/or the length of the radiation detection sub-assembly 306, including the photodetector array 404, is greater than a width and/or a length of the second substrate 408 and the molding compound 412, analog signals from photodetectors of the photodetector array 404 that do not overlap the electronics sub-assembly 308 are routed to a portion of the photodetector array 404 that overlaps the electronics sub-assembly 306. Referring to FIG. 18, a top-down view of an example photodetector array 404 depicting photodetector channels 1802 that fan inwardly from an outer portion of the photodetector array 404, that does not overlap the electronics sub-assembly 308, to an inner portion of the photodetector array 404, that does overlay the electronics sub-assembly 308, is provided. Respective channels 1802 form a connection point with a photodetector 1804 of a detector cell at the small black circle 1806 and form a connection point with the first interconnection layer 406 at the larger black circle 1808.

Figure 19:
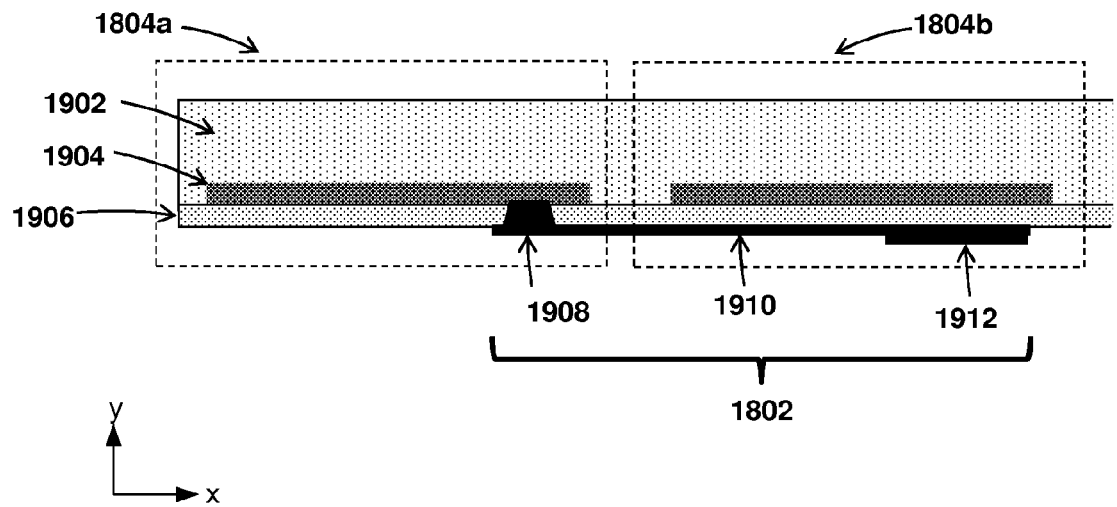
FIG. 19 illustrates a cross-sectional view of an example photodetector array comprising back-illuminated photodiodes.

Referring to FIG. 19, a cross-sectional view of an example photodetector 1804a having a channel 1802 that fans inwardly to an inner portion of the photodetector array 404 is provided. In some embodiments, the photodetector 1804a is a back-illuminated photodetector that comprises a first doped element 1902, a second doped element 1904, and a dielectric element 1906. In some embodiments, the first doped element 1902 is disposed at a top of the photodetector 1804a (e.g., nearest the scintillator 402) and may comprise silicon doped with a first dopant, such as an n-type dopant. The second doped element 1904 is disposed below a portion of the first doped element 1902 and may comprise silicon doped with a second dopant, such as a p-type dopant. The dielectric element 1906 is disposed below the first doped element 1902 and the second doped element 1904 and may comprise a silicon oxide, silicon nitride, or other composition that substantially inhibits a flow of electrical charge.

The channel 1802 may comprise a via 1908, a metal trace 1910, and a contact pad 1912. The via 1908 extends through the dielectric element 1906 and comprises an electrically conductive material (e.g., polysilicon, copper, or other electrically conductive material). In some embodiments, the via 1908 also comprises an insulator (e.g., a silicon oxide, silicon nitride, etc.) and surrounds the electrically conductive material to electrically isolate the electrically conductive material of the via 1908 from the second doped element 1904, for example. The via 1908 is electrically coupled to the metal trace 1910 disposed below the dielectric element 1906. The metal trace 1910 extends from the via 1908 to the contact pad 1912, which may be disposed at a location where the first interconnection layer 406 electrically couples to the photodetector array 404. In some embodiments, the contact pad 1912 may be disposed below a second photodetector 1804b and thus the metal trace 1910 may extended from a via 1908, disposed at the photodetector 1804a, to the contact pad 1912, disposed below the second photodetector 1804b (e.g., such that the channel 1802 for the photodetector 1804a is disposed under the photodetector 1804a and the second photodetector 1804b). Thus, the channel 1802 may extend below two or more photodetectors 1804, for example.

Figure 20:
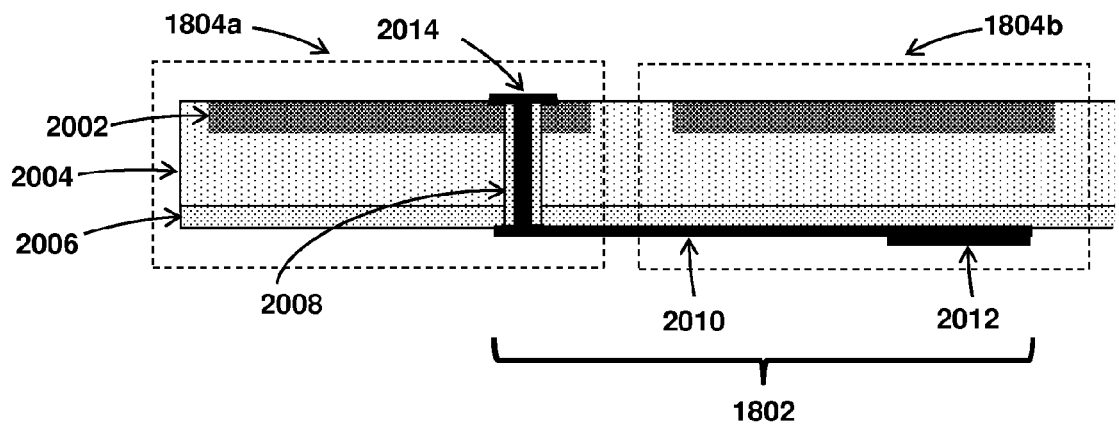
FIG. 20 illustrates a top-down view of an example photodetector array comprising front-illuminated photodiodes.

Referring to FIG. 20, a cross-sectional view of an example photodetector 1804a having a channel 1802 that fans inwardly to an inner portion of the photodetector array 404 is provided. In some embodiments, the photodetector 1804a is a front-illuminated photodetector that comprises a first doped element 2002, a second doped element 2004, and a dielectric element 2006. In some embodiments, the first doped element 2002 is disposed at a top of the photodetector 1804a (e.g., nearest the scintillator 402) and may comprise silicon doped within a first dopant, such as a p-type dopant. The second doped element 2004 is disposed below and/or around the first doped element 2002 and may comprise silicon doped with a second dopant, such as an n-type dopant. The dielectric element 2006 is disposed below the second doped element 2004 and may comprise a silicon oxide, silicon nitride, or other composition that substantially inhibits a flow of electrical charge.

The channel 1802 may comprise a via 2008, a metal trace 2010, and a contact pad 2012. The via 2008 extends through the dielectric element 2006, the second doped element 2004, and the first doped element 2002 (e.g., to couple with a second contact pad 2014 disposed at a top surface of the first doped element 2002) and comprises an electrically conductive material (e.g., polysilicon, copper, or other electrically conductive material). The via 2008 is connected to the metal trace 2010 disposed below the dielectric element 2006. The metal trace 2010 extends from the via 2008 to the contact pad 2012, which may be disposed at a location where the first interconnection layer 406 electrically couples to the photodetector array 404. In some embodiments, the contact pad 2012 may be disposed below a second photodetector 1804b and thus the metal trace 2010 may extended from a via 2008, disposed at the photodetector 1804a, to the contact pad 2012, disposed below the second photodetector 1804b (e.g., such that the channel 1802 for the photodetector 1804a is disposed under the photodetector 1804a and the second photodetector 1804b). Thus, the channel 1802 may extend below two or more photodetectors 1804, for example.

Figure 21:
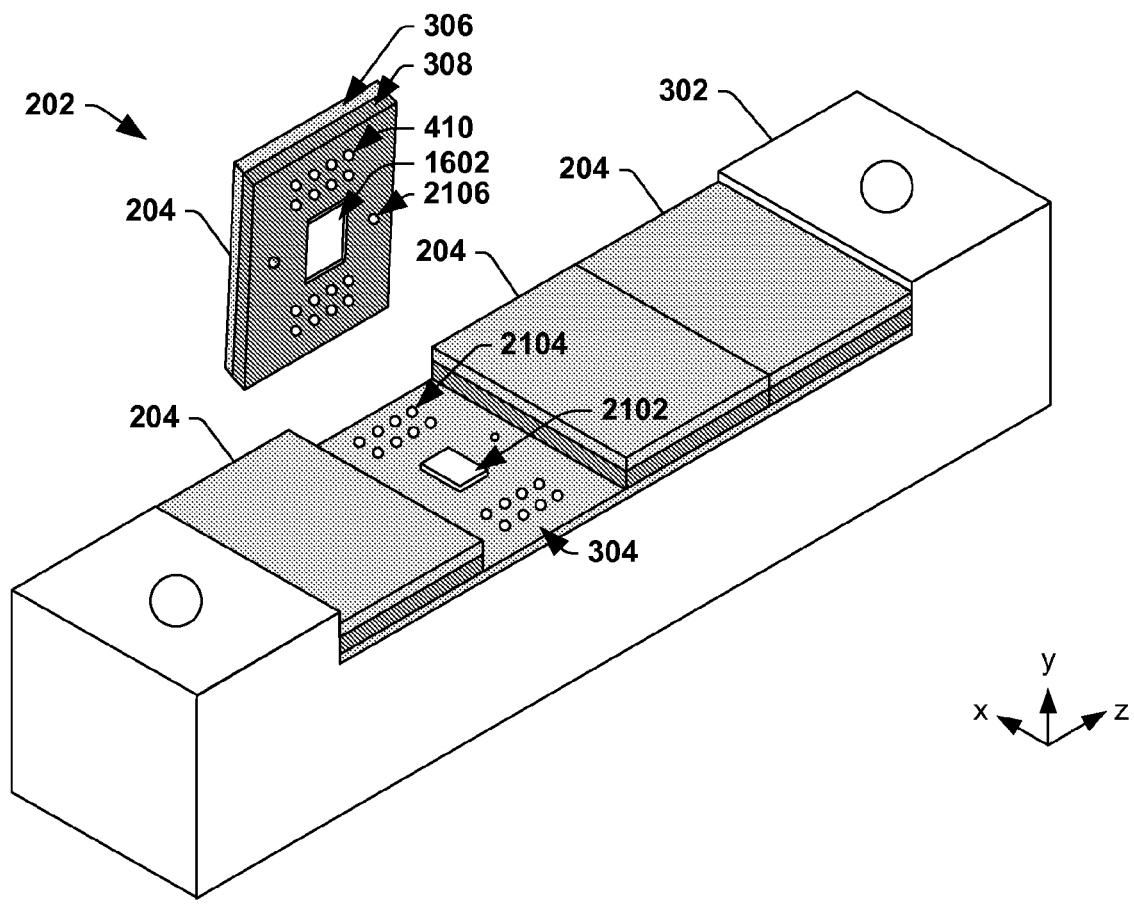
FIG. 21 illustrates a three-dimensional perspective view of an example detector module.

FIG. 21 illustrates an example detector module 202 in which a detector unit 204 is being prepared for installation on a mounting bracket 302 of the detector module 202. The detector unit 204 to be installed includes a radiation detection sub-assembly 306 and an electronics sub-assembly 308. Included within the electronics sub-assembly 308 is a thermal conduction element 1602 which is disposed at a bottom of the electronics sub-assembly 308 and is configured to be thermally coupled to a portion 2102 of the mounting bracket 302 (e.g., to facilitate the transfer of heat energy from the thermal conduction element 1602 to the mounting bracket 302).

The electronics sub-assembly 308 further comprises a second coupling element 410 configured to be electrically coupled to contact pads 2104 of the substrate 304, which has been mounted to the mounting bracket 302 to facilitate the transfer of power signals and/or communication signals between the detector unit 204 (e.g., or an electronics sub-assembly 308 thereof) and other components of a radiation imaging modality, such as an image generator 122, a controller 130, a threat analysis component, a power source, etc. and/or to facilitate coupling the detector unit 204 to ground, for example.

In some embodiments, the detector unit 204 comprises one or more fiducials 2106 for aligning the detector unit 204 on the substrate 304. By way of example, in some embodiments, the fiducials 2106 may comprise optical fiducials for optically aligning the detector unit 204 with the mounting bracket 302. For example, the mounting bracket 302 may comprise one or more apertures through which is a laser beam or other light source may be guided and the optical fiducials may comprise a reflective material configured to reflect the laser or other light. When a sufficient degree of the laser beam or light source is reflected back through the aperture(s), it may be determined that the detector unit 204 is aligned with the mounting bracket 302 as desired. In other embodiments, the fiducials 2106 may comprise physical fiducials for physically aligning the detector unit 204 with the mounting bracket 302 and/or the detector array 118. By way of example, the detector unit 204 may comprise a female fiducial (e.g., an aperture) configured to be mated with a corresponding male fiducial of the mounting bracket 302 (e.g., a pin which extends from a surface of the mounting bracket 302 adjacent the detector unit 204) or vice-versa. In still other embodiments, fiducials are disposed on the substrate 304 and are used by a machine to align the detector unit 204 with the substrate 304. For example, the fiducials may comprise optical reflecting fiducials that a robot, comprising a camera, uses to identify a region of the substrate 304 upon which to attach the detector unit 204.

Figure 22:
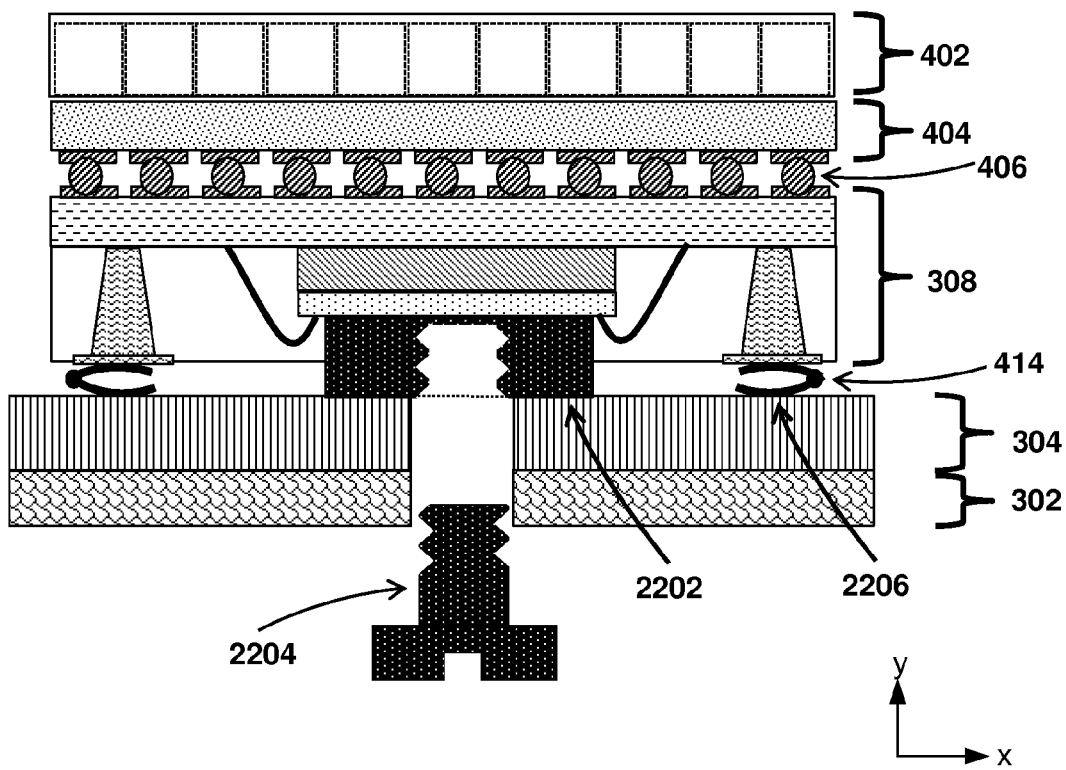
FIG. 22 illustrates a cross-sectional view of an example detector unit.

Referring to FIG. 22, a cross-sectional view of an example detector unit 204 having a mounting structure for mounting the detector unit 204 to the mounting bracket 302 is provided. In the example embodiment, the electronics sub-assembly 308 comprises a receiving assembly 2202, such as a threaded nut or other female coupling assembly, for receiving an attachment assembly 2204, such as threaded screw or other male coupling assembly. Moreover, the mounting bracket 302 and the substrate 304 comprise an aperture (e.g., which may be threaded or non-threaded) through which the attachment assembly 2204 is received to physically couple with the receiving assembly 2202. The example detector unit 204 illustrated in FIG. 22 also provides yet another example configuration for the second interconnection layer 414. In this example, the second interconnection layer 414 comprises compressible springs 2206 configured to compress as pressure is applied by way of the receiving assembly 2202 and the attachment assembly 2204.

Figure 23:
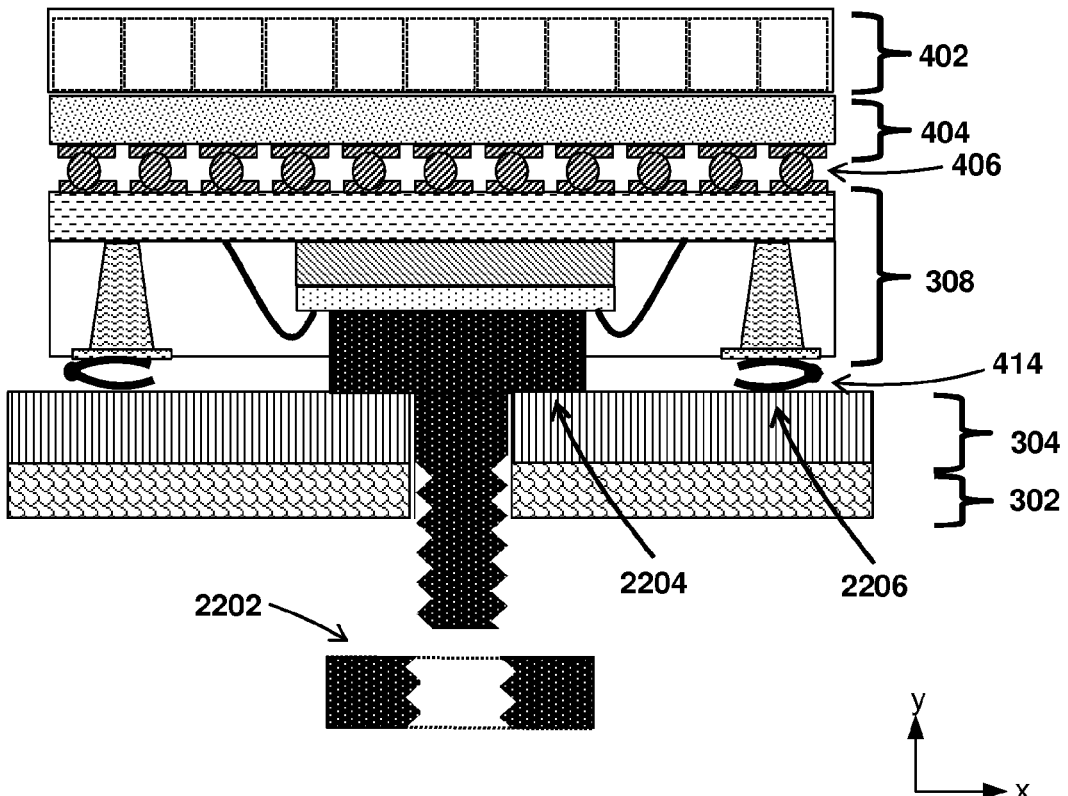
FIG. 23 illustrates a cross-sectional view of an example detector unit.

It may be appreciated that while FIG. 22 illustrates the electronics sub-assembly 308 as comprising the receiving assembly 2202, in other embodiments, the electronics sub-assembly 3008 may comprise the attachment assembly 2204 as shown in FIG. 23.

Figure 24:
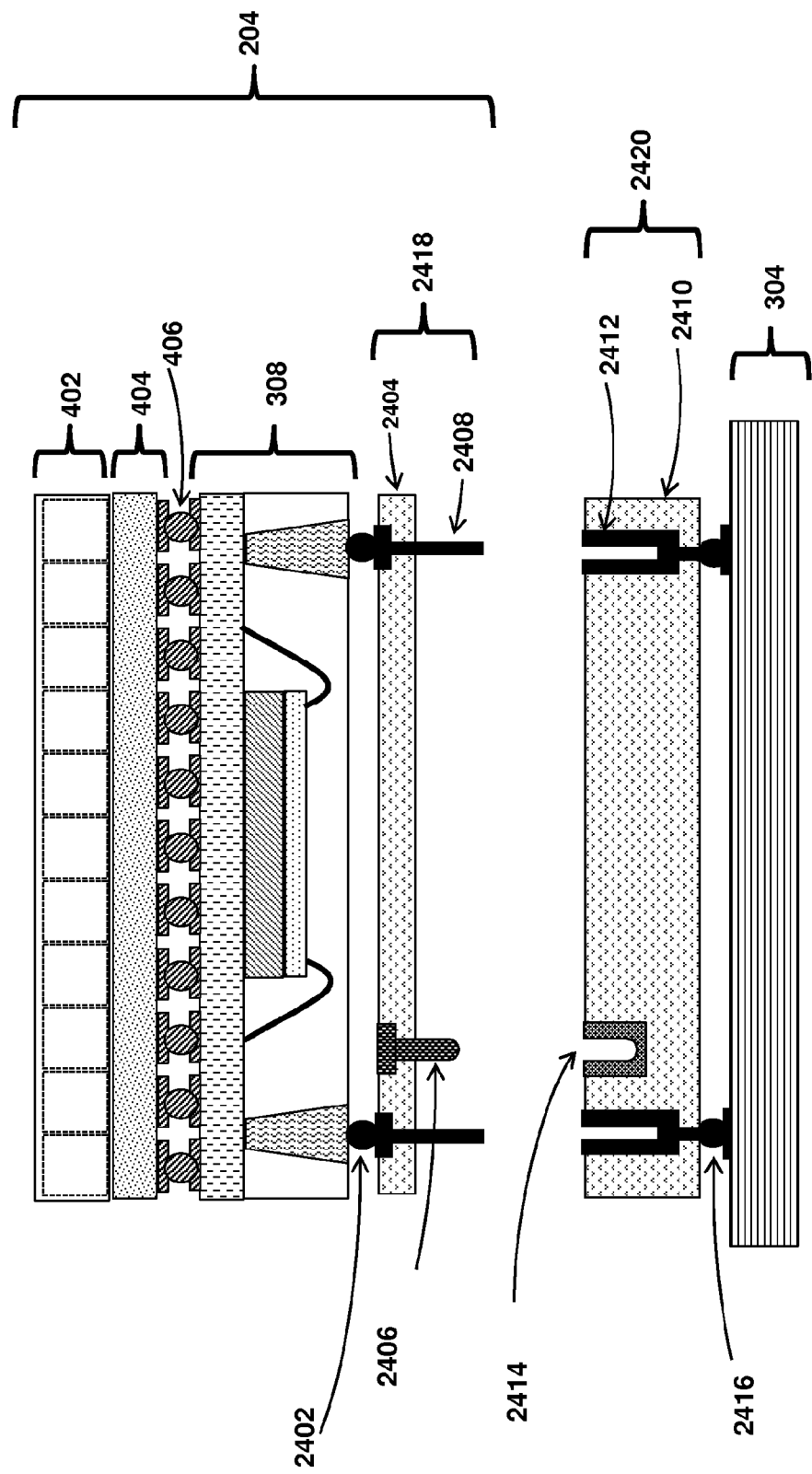
FIG. 24 illustrates an example detector module in which a detector unit is being prepared for installation on the substrate.

FIG. 24 illustrates yet another example detector module 202 in which a detector unit 204 is being prepared for installation on the substrate 304. The substrate 304 may be mounted to the mounting bracket 302 (e.g., not shown in FIG. 24).

In this example embodiment, the detector module 204 further comprises a first coupling assembly 2418 configured to be paired with a second coupling assembly 2420 that has been physically and/or electrically coupled to the substrate 304. The first coupling assembly 2418 comprises a connector tile 2404 electrically coupled and/or physically coupled to the electronics sub-assembly via solder balls 2402 or other electrically conductive fasteners, for example. The connector tile 2404 comprises one or more fiducials 2406 for aligning the detector unit 204 with the substrate 304 and/or one or more pins 2408 for electrically coupling the first coupling assembly 2418 to the second coupling assembly 2420 (e.g., to facilitate the transmission of digital signals and/or power through the first coupling assembly 2418 and the second coupling assembly 2420).

The second coupling assembly 2420 comprises a second connector tile 2410 electrically coupled and/or physically coupled to the substrate 304 via solder balls 2416 or other electrically conductive fasteners, for example. The second connector tile 2410 comprises one or more alignment sockets 2414 for receiving the fiducials 2406 and one or more electrical sockets 2412 for receiving the pins 2408.

When the first coupling assembly 2418 is paired (e.g., mated) with the second coupling assembly 2420, the fiducials 2406 couple with the alignment sockets 2414 and the pins 2408 couple with the electrical sockets 2412 to physically couple and/or electrically couple the substrate 304 to the detector unit 204, for example.

It may be appreciated that the foregoing embodiments merely describe some of the various configurations for a detector unit 204 and that other obvious variations of the foregoing embodiments and/or foregoing features are also contemplated. By way of example, in some embodiments, the pins 2408 and the electrical sockets 2412 may provide sufficient alignment when coupling the detector unit 204 to the substrate 304 such that additional (e.g., non-conductive) fiducials are redundant. As another example, alignment pins or other alignment features may be used to align the electronic sub-assembly 308 with the photodetector array 404. As still another example, the fiducials 2406 may extend a length (e.g., from top to bottom) of the electronic sub-assembly 308 and may be used to align the electronic sub-assembly 308 with both the photodetector array 404 and the substrate 304. As yet another example, the fiducials 2406 may extend from the electronic sub-assembly 308 to the mounting bracket 302 and/or may be used to secure the electronic sub-assembly to the mounting bracket 302. As still another example, the fiducials 2406 may be coupled to the thermal conduction element 1602 and may be used to conduct heat from the detector unit 204 to the mounting bracket 302, for example.

Figure 25:
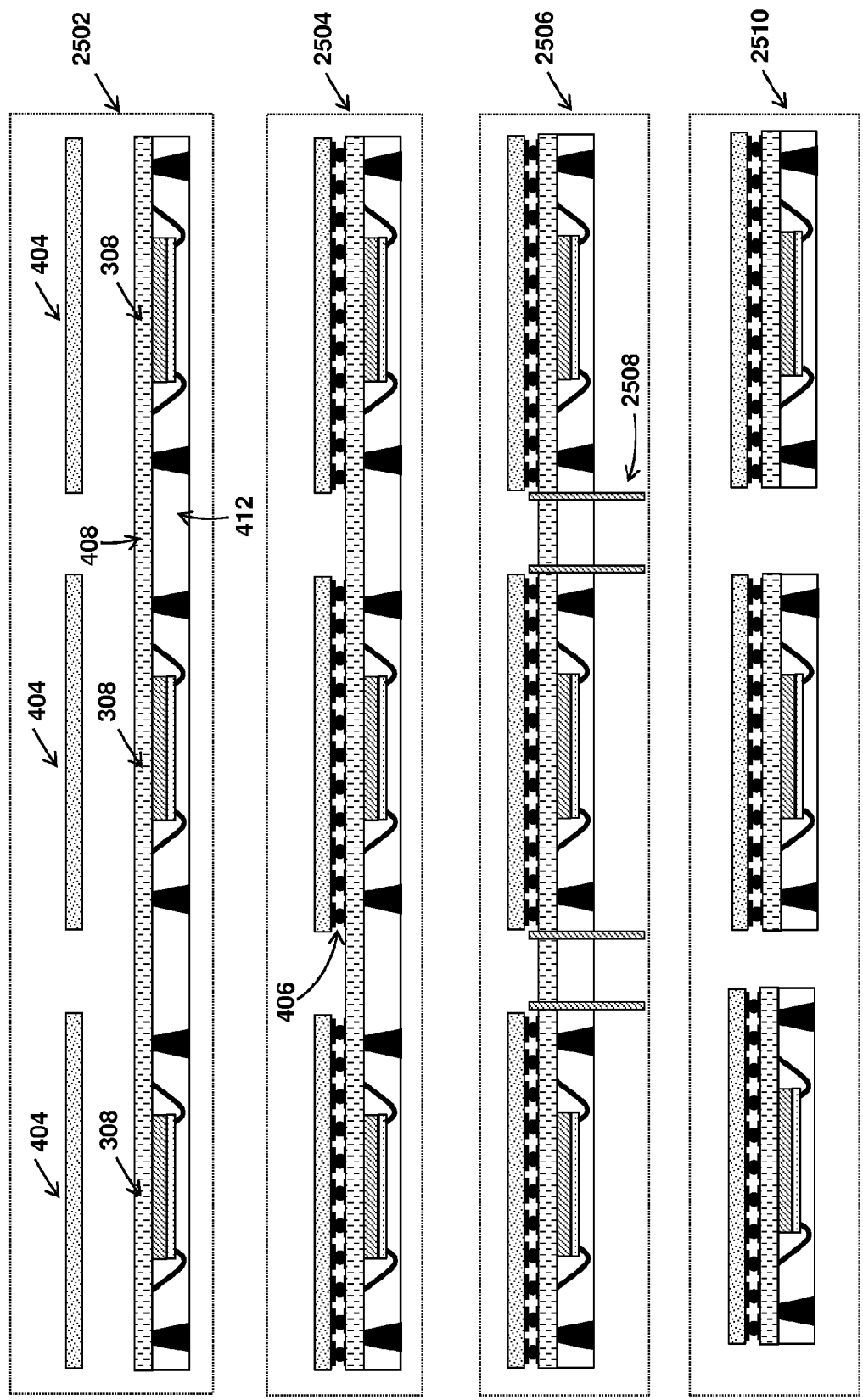
FIG. 25 illustrates an example method diagram for assembling detector units and/or elements thereof.

It may be appreciated that as previously describe, the detector unit 204 and/or portions thereof may be packaged to form an integral, structural element which can be physically and/or functionally coupled to other portions of the detector unit 204 and/or other detector units to form the detector array. Referring to FIG. 25, an example method diagram is provided for assembling detector units and/or elements thereof.

At 2502, photodetector arrays 404 and electronic sub-assemblies 308 are received. In some embodiments, the photodetector arrays 404 are individually sized according to the desired dimensions of the detector unit 204 while the electronic sub-assemblies 308 for a plurality of detector units are physically coupled together by way of a shared second substrate 408 and/or a shared molding compound 412.

At 2504 in the example method, the photodetector arrays 404 are physically coupled and/or electrically coupled to the electronic sub-assemblies 308 via the first interconnection layer 406. As previously described, the first interconnection layer 406 may comprise solder balls, conductive epoxy, etc.

At 2506 in the example method, the electronic sub-assemblies 308 are trimmed to size by way of saw cuts 2508 which slice through the shared second substrate 408 and/or the shared molding compound 412 to form individual detector units, as shown at 2510 in the example method.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers features, elements, etc. mentioned herein, such as etching techniques, implanting techniques, doping techniques, spin-on techniques, sputtering techniques such as magnetron or ion beam sputtering, growth techniques, such as thermal growth, or deposition techniques such as chemical vapor deposition (CVD), physical vapor deposition (PVD), plasma enhanced chemical vapor deposition (PECVD), or atomic layer deposition (ALD), for example.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein.

Also, it will be understood that not all operations are necessary in some embodiments.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising". The claimed subject matter may be implemented as a method, apparatus, or article of manufacture (e.g., as software, firmware, hardware, or any combination thereof).

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally correspond to "channel A and channel B" or two different (or identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and/or advantageous for any given or particular application.

What is claimed is:

1. A detector unit for a detector array of a radiation imaging modality, comprising:
    an electronics sub-assembly comprising:
        an analog-to-digital (A/D) converter enclosed within a molding compound;
        a photodetector array;
        a first substrate disposed at a first surface of the electronics sub-assembly and between the molding compound and the photodetector array, wherein the first substrate electrically couples the electronics sub-assembly to the photodetector array;
        a first coupling element that electrically couples the A/D converter to the first substrate, the first coupling element defining:
            an analog signal route through the first coupling element in a first direction, from the first substrate to the A/D converter; and
            a digital signal route back through the first coupling element in a second direction opposite the first direction, from the A/D converter to the first substrate;
        a first interconnection layer disposed between a first surface of the first substrate and the photodetector array to electrically couple the first substrate to the photodetector array; and
        a via formed within the molding compound and configured to electrically couple the first substrate to a second substrate.

2. The detector unit of claim 1, wherein the first substrate comprises a printed circuit board.

3. The detector unit of claim 1, wherein a second surface of the first substrate diametrically opposes the first surface of the first substrate.

4. The detector unit of claim 1, wherein the via extends from the first substrate to a second surface of the electronics sub-assembly, the second surface diametrically opposing the first surface.

5. The detector unit of claim 1, wherein the electronics sub-assembly further comprises:
    a shielding element disposed, within the molding compound, between the A/D converter and the first substrate, the shielding element configured to shield the A/D converter from radiation.

6. The detector unit of claim 1, wherein the first coupling element comprises a wirebond.

7. The detector unit of claim 1, wherein the electronics sub-assembly further comprises:
    a thermal conduction element configured to dissipate heat generated by the A/D converter.

8. The detector unit of claim 1, wherein:
    the first surface of the first substrate faces the A/D converter,
    a first portion of the first surface of the first substrate is concealed by the molding compound and the A/D converter,
    a second portion of the first surface of the first substrate, between a sidewall of the molding compound and a sidewall of the first substrate, is exposed, and
    the electronics sub-assembly comprises a second coupling element in contact with the second portion of the first surface of the first substrate.

9. The detector unit of claim 1:
    further comprising a scintillator; and
    wherein the photodetector array comprises:
        a first photodetector;
        a second photodetector adjacent the first photodetector; and
        a channel configured to receive the analog signal from the first photodetector, the channel disposed below the first photodetector and the second photodetector.

10. The detector unit of claim 1, wherein the electronics sub-assembly further comprises a photodetector support coupled to a portion of the photodetector array not overlapping the first substrate.

11. A radiation imaging modality, comprising:
an ionizing radiation source; and
a detector array configured to detect radiation generated by the ionizing radiation source, the detector array comprising:
- a radiation detection sub-assembly, comprising:
  - a scintillator configured to generate luminescent photons based upon radiation impinging thereon; and
  - a photodetector array comprising at least one photodetector configured to detect at least some of the luminescent photons and to generate an analog signal based upon the at least some of the luminescent photons;
- an electronics sub-assembly, comprising:
  - an analog-to-digital (A/D) converter enclosed within a molding compound and configured to convert the analog signal to a digital signal;
  - a first substrate disposed at a first surface of the electronics sub-assembly and between the molding compound and the photodetector array, wherein the first substrate electrically couples the electronics sub-assembly to the photodetector array; and
  - a first coupling element that electrically couples the A/D converter to the first substrate, the first coupling element defining:
    - a first signal route for the analog signal, the first signal route passing through the first coupling element in a first direction, from the first substrate to the A/D converter; and
    - a second signal route for the digital signal, the second signal route passing through the first coupling element in a second direction opposite the first direction, from the A/D converter to the first substrate;
  - a second substrate; and
  - a threaded mechanical fastener that threadingly couples the electronics sub-assembly to the second substrate, wherein at least a portion of the threaded mechanical fastener is enclosed within the molding compound.

12. The radiation imaging modality of claim 11, wherein the electronics sub-assembly comprises:
a photodetector support coupled to a portion of the photodetector array not overlapping the first substrate.

13. A radiation imaging modality, comprising:
an ionizing radiation source; and
a detector array configured to detect radiation generated by the ionizing radiation source, the detector array comprising:
- a radiation detection sub-assembly, comprising:
  - a scintillator configured to generate luminescent photons based upon radiation impinging thereon; and
  - a photodetector array comprising at least one photodetector configured to detect at least some of the luminescent photons and to generate an analog signal based upon the at least some of the luminescent photons;
- an electronics sub-assembly, comprising:
  - an analog-to-digital (A/D) converter enclosed within a molding compound and configured to convert the analog signal to a digital signal; and
  - a first substrate disposed at a first surface of the electronics sub-assembly and between the molding compound and the photodetector array, wherein the first substrate electrically couples the electronics sub-assembly to the photodetector array, wherein:
    - a first surface of the first substrate faces the A/D converter,
    - a first portion of the first surface of the first substrate is concealed by the molding compound and the A/D converter, and
    - a second portion of the first surface of the first substrate, between a sidewall of the molding compound and a sidewall of the first substrate, is exposed;
  - a first coupling element configured to electrically couple the A/D converter to the first substrate, the first coupling element defining:
    - a first route for the analog signal, the first route passing from the first substrate, through the first coupling element in a first direction, to the A/D converter; and
    - a second route for the digital signal, the second route passing from the A/D converter, through the first coupling element in a second direction opposite the first direction, to the first substrate;
  - a second coupling element in contact with the second portion of the first surface of the first substrate;
  - a second substrate; and
  - a mechanical fastener coupling the electronics sub-assembly to the second substrate, wherein at least a portion of the mechanical fastener is enclosed within the molding compound.

* * * * *